(12) United States Patent
Banzai et al.

(10) Patent No.: US 8,349,063 B2
(45) Date of Patent: Jan. 8, 2013

(54) PENCIL LEAD AND PRODUCTION PROCESS FOR THE SAME

(75) Inventors: Satoru Banzai, Fujioka (JP); Katsunori Kitazawa, Fujioka (JP)

(73) Assignee: Mitsubishi Pencil Company, Limited, Shinagawa-Ku, Tokyo (JP)

( * ) Notice: Subject to any disclaimer, the term of this patent is extended or adjusted under 35 U.S.C. 154(b) by 0 days.

(21) Appl. No.: 13/265,476

(22) PCT Filed: Apr. 22, 2010

(86) PCT No.: PCT/JP2010/057159
§ 371 (c)(1),
(2), (4) Date: Oct. 20, 2011

(87) PCT Pub. No.: WO2010/123070
PCT Pub. Date: Oct. 28, 2010

(65) Prior Publication Data
US 2012/0037035 A1    Feb. 16, 2012

(30) Foreign Application Priority Data

| Apr. 24, 2009 | (JP) | 2009-106112 |
| Apr. 24, 2009 | (JP) | 2009-106113 |
| Apr. 24, 2009 | (JP) | 2009-106114 |
| Apr. 24, 2009 | (JP) | 2009-106115 |
| Apr. 24, 2009 | (JP) | 2009-106116 |
| Apr. 24, 2009 | (JP) | 2009-106117 |
| Mar. 9, 2010 | (JP) | 2010-051954 |
| Mar. 9, 2010 | (JP) | 2010-051955 |
| Mar. 9, 2010 | (JP) | 2010-051956 |
| Mar. 9, 2010 | (JP) | 2010-051957 |
| Mar. 9, 2010 | (JP) | 2010-051958 |
| Mar. 9, 2010 | (JP) | 2010-051959 |

(51) Int. Cl.
*C09D 13/00* (2006.01)
(52) U.S. Cl. .................... 106/31.11; 106/31.65
(58) Field of Classification Search .............. 106/31.11, 106/31.65
See application file for complete search history.

(56) References Cited

U.S. PATENT DOCUMENTS
7,815,385 B2   10/2010   Izawa et al.
(Continued)

FOREIGN PATENT DOCUMENTS
JP   56-65947 U   6/1981
(Continued)

OTHER PUBLICATIONS
International Search Report (PCT/ISA/210) issued on Jun. 1, 2010, by Japanese Patent Office as the International Searching Authority for International Application No. PCT/JP2010/057159.

*Primary Examiner* — Melvin C Mayes
*Assistant Examiner* — Veronica F Faison
(74) *Attorney, Agent, or Firm* — Buchanan Ingersoll & Rooney PC

(57) ABSTRACT

A pencil lead containing flake graphite which has an ab face having a flatness of at least 2 μm or less and in which an aspect ratio of an a axis or a b axis in the ab face to a c axis is 5 or more is provided with a structure in which nanoparticles having a mv value of 0.05 to 2 based on 100 of a volume average diameter (mv value) of the graphite and having a sphericity of 0.1 to 20 nm or nanoparticles having a mv value of 0.05 to 2 based on 100 of a volume average diameter (mv value) of the graphite and having a specific surface area of 200 to 600 m²/g are brought into contact with the ab face of the graphite or a structure in which they are adhered to the ab face of the graphite.

46 Claims, 1 Drawing Sheet

U.S. PATENT DOCUMENTS

| | | |
|---|---|---|
| 2009/0180824 A1 | 7/2009 | Izawa et al. |
| 2010/0166486 A1 | 7/2010 | Izawa et al. |
| 2011/0002728 A1 | 1/2011 | Izawa et al. |

FOREIGN PATENT DOCUMENTS

| | | |
|---|---|---|
| JP | 6-293874 A | 10/1994 |
| JP | 7-018213 A | 1/1995 |
| JP | 11-256091 A | 9/1999 |
| JP | 2004-331690 A | 11/2004 |
| JP | 2007-138031 A | 6/2007 |
| JP | 2008-115211 A | 5/2008 |
| JP | 4240417 B2 | 3/2009 |
| JP | 2010-116451 A * | 5/2010 |
| WO | WO 2007/142135 A1 | 12/2007 |

* cited by examiner

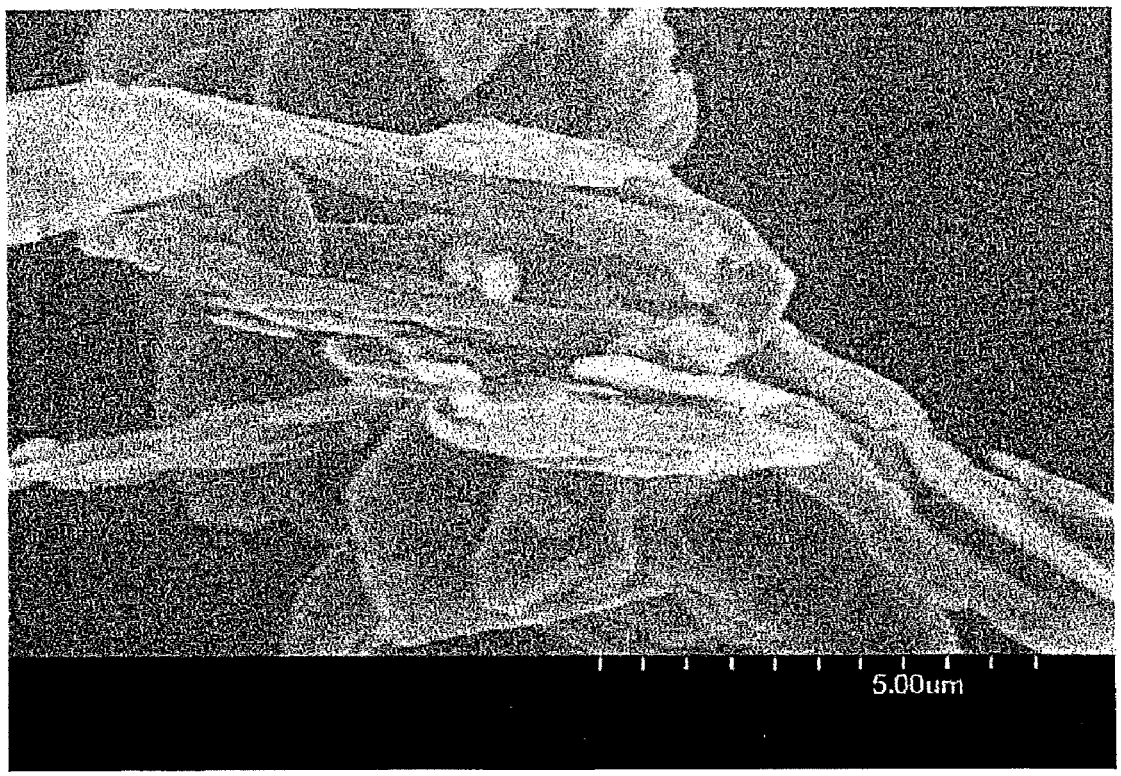

PENCIL LEAD AND PRODUCTION PROCESS FOR THE SAME

TECHNICAL FIELD

The present invention relates to a pencil lead such as pencil leads for mechanical pencils, pencil leads for wood case pencils and the like, more specifically to a pencil lead which has high strength and smooth writing feeling and which provides drawn lines with a deep and vivid black color and a production process for the same.

BACKGROUND ART

In general, important characteristics required to pencil leads are good writing feeling, a good color developing property of the drawn lines and high mechanical strength.

In order to provide a solid drawing material which is increased in an oil-impregnable effective pore volume and a surface area in a solid drawing material such as a pencil lead and further enhanced in compressive strength and has smooth writing feeling, a satisfactory color developing property and satisfactory drawn line intensity and which has a small abrasion amount and a good erasing property and is less liable to be stained when rubbing the drawn lines with a finger and a production process for the same, the present applicant proposes a solid drawing material prepared by forming a solid drawing material lead body by subjecting a blend composition for a solid drawing material containing at least a nanomaterial (nanoparticles) to burning treatment or non-burning treatment and filling pores of the above solid drawing material lead body with a lubricant (refer to, for example, patent document 1).

Further, it is known as well that a production process for a lead body prepared by adhering in advance a part or all of fine particles having an average particle diameter of 100 nm or less to a surface of a tabular extender to prepare a fine particle-adhered tabular extender, mixing and kneading it with lead body materials and then molding the mixture by extrusion molding is provided for the purpose of providing a process for producing a pencil lead which is an extrusion-molded lead body capable of forming a thick film containing fine particles in a high concentration by writing (refer to, for example, patent document 2). The above technique includes the content disclosed in patent document 1 described above. A thickness of the film described in the above patent document 2 is obtained by expressing merely power for masking the ground by a numerical value, and it is not related to the visual color (intensity) and the writing feeling.

On the other hand, the following defects are present in the evaluation item called "touch in writing" or "writing feeling" in patent document 1 described above. That is to evaluate it based on feeling obtained when a tester draws lines by a one-sidedly abraded face for a short time while maintaining a posture taken in starting the test without almost changing a writing face of the mechanical pencil. The one-sidedly abraded face is a face which is abraded and flat, and therefore the lines are written by a face which is almost abraded and flat until finishing writing since initiating it.

Accordingly, it has been found that when a lead to be tested is applied to a product developed by the present applicant which is put recently on the market and gains public favor (a mechanical pencil, trade name: "KURUTOGA", manufactured by Mitsubishi Pencil Co., Ltd., international application WO2007/142135 (U.S. Pat. No. 4,240,417)), to be specific, when the test is carried out by applying it to a mechanical pencil of a type in which a lead is rotated whenever written to always carry out writing by a fresh part, the problem that such writing feeling that has so far been obtained is not reproduced is brought about.

That is, even if nanoparticles are simply mixed by the art described in patent document 1 and the like described above to form solid drawing materials, favorable evaluations of excellent drawn line intensity, writing feeling in actual writing and a static•dynamic frictional coefficient which is a typical index thereof have not been able to be obtained. When measuring a static•dynamic frictional coefficient for a solid drawing material obtained by simply mixing nanoparticles, the problem that the evaluation item called "the touch in writing" or "the writing feeling" described above is not always reproduced depending on a production process and a constitution of the lead body has been found.

As described above, the existing state is that pencil leads which have better and smoother writing feeling and high strength and which provide drawn lines with a deep and brilliant black color and a production process for the same are desired earnestly for pencil leads prepared by using nanomaterials (nanoparticles) and pencil leads used for a mechanical pencil of a type in which a lead is rotated whenever written to always carry out writing by a fresh part in addition to pencil leads used for conventional mechanical pencils, wood case pencils and the like.

Patent document 1: Japanese Patent Application Laid-Open No. 2007-138031 (claims, examples and others)

Patent document 2: Japanese Patent Application Laid-Open No. 2008-115211 (claims, examples and others)

DISCLOSURE OF THE INVENTION

Problems to be Solved by the Invention

In light of the problems on the conventional art and the existing state described above, the present invention solves them, and an object of the present invention is to provide a pencil lead which has better and smoother writing feeling and which provides drawn lines with high intensity and a brilliant black color and a production process for the same, wherein it is a pencil lead prepared by using nanoparticles and used for a mechanical pencil of a type in which a lead is rotated whenever written to always carry out writing by a fresh part in addition to pencil leads used for conventional mechanical pencils, wood case pencils and the like.

Means for Solving the Problems

Intense researches repeated by the present inventors in light of the conventional problems described above have resulted in successfully obtaining a pencil lead having drawn line intensity, writing feeling and a low static•dynamic frictional coefficient which exceed those of the pencil leads disclosed in patent document 1 and the like each described above and a production process for the same by forming a lead body of a pencil lead from graphite and the like, then evenly dispersing nanoparticles having a specific particle diameter and a specific sphericity in a specific liquid or evenly dispersing nanoparticles having a specific particle diameter and a specific surface area in a specific liquid and impregnating the lead body with the dispersion liquid to produce a pencil lead, and thus the present invention has come to be completed.

Also, intense researches repeated by the present inventors in light of the conventional problems described above have resulted in successfully obtaining a pencil lead having drawn line intensity, writing feeling and a low static•dynamic frictional coefficient which exceed those of the pencil leads disclosed in patent document 1 and the like each described above and a production process for the same by bringing flake graphite having specific physical properties into contact with nanoparticles having specific physical properties, then fixing the nanoparticles thereon to prepare a composite, forming a lead body by using the composite graphite and then impregnating the lead body with a liquid having specific physical properties to produce a pencil lead, and thus the present invention has come to be completed.

Further, intense researches repeated by the present inventors in light of the conventional problems described above have resulted in successfully obtaining a production process for a pencil lead having drawn line intensity, writing feeling and a low static•dynamic frictional coefficient which exceed those of the pencil leads disclosed in patent document 1 and the like each described above by using flake graphite having specific physical properties, kneading the flake graphite with nanoparticles having specific physical properties which are dispersed in a plasticizer or a solvent and then forming a lead body from the kneaded matter, and thus the present invention has come to be completed.

That is, the present invention comprises the following items (1) to (21).

(1) A pencil lead containing flake graphite which has an ab face having a flatness of at least 2 μm or less and in which an aspect ratio of an a axis or a b axis in the ab face to a c axis is 5 or more, wherein nanoparticles having a mv value of 0.05 to 2 based on 100 of a volume average diameter (mv value) of the graphite and having a sphericity of 0.1 to 20 nm are brought into contact with the ab face of the graphite.

(2) A pencil lead containing flake graphite which has an ab face having a flatness of at least 2 μm or less and in which an aspect ratio of an a axis or a b axis in the ab face to a c axis is 5 or more, wherein nanoparticles having a mv value of 0.05 to 2 based on 100 of a volume average diameter (mv value) of the graphite and having a specific surface area of 50 to 800 $m^2/g$ are brought into contact with the ab face of the graphite.

(3) A pencil lead containing flake graphite which has an ab face having a flatness of at least 2 μm or less and in which an aspect ratio of an a axis or a b axis in the ab face to a c axis is 5 or more, wherein nanoparticles having a mv value of 0.05 to 2 based on 100 of a volume average diameter (mv value) of the graphite and having a sphericity of 0.1 to 20 nm are adhered to the ab face of the graphite.

(4) A pencil lead containing flake graphite which has an ab face having a flatness of at least 2 μm or less and in which an aspect ratio of an a axis or a b axis in the ab face to a c axis is 5 or more, wherein nanoparticles having a mv value of 0.05 to 2 based on 100 of a volume average diameter (mv value) of the graphite and having a specific surface area of 50 to 800 $m^2/g$ are adhered to the ab face of the graphite.

(5) The pencil lead as described in any one of the above items (1) to (4), wherein the nanoparticles used for the pencil lead are carbon nanoparticles.

(6) The pencil lead as described in the above item (5), wherein the carbon nanoparticles are diamond.

(7) The pencil lead as described in any one of the above items (1) to (6), wherein the nanoparticles have a volume average diameter (mv value) of 4 to 100 nm.

(8) The pencil lead as described in any one of the above items (1) to (7), wherein a total frictional coefficient obtained by dividing an average value (n=10) of total frictional forces in lines drawn by a drawing method using a drawing apparatus prescribed in JIS S 6005:2007 by a writing load is 0.191 to 0.218.

(9) The pencil lead as described in any one of the above items (1) to (8), wherein when a polished cross section of the pencil lead is observed in an area of 5 μm×5 μm by means of FE-SEM (accelerating voltage: 5 kV), 1 to 300 particles of the nanoparticles are observed.

(10) A production process for the pencil lead as described in any one of the above items (1), (2) and (5) to (9), wherein a lead body of a pencil lead containing flake graphite which has an ab face having a flatness of at least 2 μm or less and in which an aspect ratio of an a axis or a b axis in the ab face to a c axis is 5 or more is formed; then nanoparticles are dispersed in a liquid having a refractive index of 1.3 to 1.5 and a viscosity of 7 to 200 $mm^2/s$ at 25° C., and the lead body is then impregnated with the liquid.

(11) A production process for the pencil lead as described in any one of the above items (3) and (5) to (9), wherein flake graphite which has an ab face having a flatness of at least 2 μm or less and in which an aspect ratio of an a axis or a b axis in the ab face to a c axis is 5 or more is brought into contact with nanoparticles having a mv value of 0.05 to 2 based on 100 of a volume average diameter (mv value) of the graphite and having a sphericity of 0.1 to 20 nm; then the nanoparticles are fixed thereon to prepare a composite; a lead body is formed by using the composite graphite and impregnated with a liquid having a refractive index of 1.3 to 1.5 and a viscosity of 7 to 200 $mm^2/s$ at 25° C.

(12) A production process for the pencil lead as described in any one of the above items (4) to (9), wherein flake graphite which has an ab face having a flatness of at least 2 μm or less and in which an aspect ratio of an a axis or a b axis in the ab face to a c axis is 5 or more is brought into contact with nanoparticles having a mv value of 0.05 to 2 based on 100 of a volume average diameter (mv value) of the graphite and having a specific surface area of 50 to 800 $m^2/g$; then the nanoparticles are fixed thereon to prepare a composite; a lead body is formed by using the composite graphite and impregnated with a liquid having a refractive index of 1.3 to 1.5 and a viscosity of 7 to 200 $mm^2/s$ at 25° C.

(13) The production process for the pencil lead as described in the above item (11) or (12), wherein the graphite is brought into contact with the nanoparticles by electrostatic force.

(14) A production process for a pencil lead, wherein flake graphite which has an ab face having a flatness of at least 2 μm or less and in which an aspect ratio of an a axis or a b axis in the ab face to a c axis is 5 or more and nanoparticles having a mv value of 0.05 to 2 based on 100 of a volume average diameter (mv value) of the graphite and having a sphericity of 0.1 to 20 nm are dispersed in a plasticizer or a solvent and kneaded, and then a lead body is formed from the kneaded matter.

(15) A production process for a pencil lead, wherein flake graphite which has an ab face having a flatness of at least 2 μm or less and in which an aspect ratio of an a axis or a b axis in the ab face to a c axis is 5 or more and nanoparticles having a mv value of 0.05 to 2 based on 100 of a volume average diameter (mv value) of the graphite and having specific surface area of 50 to 800 $m^2/g$ are dispersed in a plasticizer or a solvent and kneaded, and then a lead body is formed from the kneaded matter.

(16) The production process for a pencil lead as described in the above item (14) or (15), wherein the nanoparticles are carbon nanoparticles.

(17) The production process for a pencil lead as described in the above item (16), wherein the nanoparticles are diamond.

(18) The production process for a pencil lead as described in any one of the above items (14) to (17), wherein the nanoparticles have a volume average diameter (mv value) of 4 to 100 nm.

(19) The production process for a pencil lead as described in any one of the above items (14) to (18), wherein a total frictional coefficient obtained by dividing an average value (n=10) of total frictional forces in lines drawn by a drawing method using a drawing apparatus prescribed in JIS S 6005: 2007 by a writing load is 0.191 to 0.218.

(20) The production process for a pencil lead as described in any one of the above items (14) to (19), wherein a clearance formed between the flake graphites by the nanoparticles is impregnated with a liquid having a refractive index of 1.3 to 1.5 and a viscosity of 7 to 200 mm$^2$/s at 25° C. after forming the lead body.

(21) The production process for a pencil lead as described in any one of the above items (14) to (20), wherein when a polished cross section of the pencil lead is observed in an area of 5 μm×5 μm by means of FE-SEM (accelerating voltage: 5 kV), 1 to 300 nanoparticles are observed.

In the drawing apparatus prescribed in JIS S 6005:2007 used in the present invention, a lead body is slanted at an angle of 75 degrees to draw lines while allowing the lead body to rotate on its axis, and a drawing mode is close to a mode in writing and drawing by the foregoing mechanical pencil of a type in which a lead is rotated whenever written to always carry out writing by a fresh part. In the present invention, a value (n=10) obtained by dividing an average value of total frictional forces in lines drawn by a drawing method using a drawing apparatus prescribed in JIS S 6005:2007 by a writing load is set to a dynamic frictional coefficient, and a value obtained by dividing a frictional force in the beginning of writing by a writing load is set to a static frictional coefficient to add to evaluation items.

Effects of the Invention

According to the present invention, provided are a pencil lead using nanoparticles which has better and smoother writing feeling and which provides drawn lines with high intensity and a brilliant black color and a production process for the same, wherein the pencil lead is used for a mechanical pencil of a type in which a lead is rotated whenever written to always carry out writing by a fresh part in addition to pencil leads used for conventional mechanical pencils, wood case pencils and the like.

BRIEF DESCRIPTION OF THE DRAWINGS

FIG. 1 is an explanatory drawing based on an electron microphotograph (SEM) for measuring a flatness and the like of natural flake graphite.

MODES FOR CARRYING OUT THE INVENTION

The embodiments of the present invention, to be specific, a first embodiment to a sixth embodiment shall be explained below in detail by every embodiment.

First Embodiment

A pencil lead in the first embodiment of the present invention is a pencil lead containing flake graphite which has an ab face having a flatness of at least 2 μm or less and in which an aspect ratio of an a axis or a b axis in the ab face to a c axis is 5 or more, wherein nanoparticles having a my value of 0.05 to 2 based on 100 of a volume average diameter (mv value) of the graphite and having a sphericity of 0.1 to 20 nm are brought into contact with the ab face of the graphite.

Further, a production process for the pencil lead in the first embodiment of the present invention is characterized by forming a lead body of a pencil lead containing flake graphite which has an ab face having a flatness of at least 2 μm or less and in which an aspect ratio of an a axis or a b axis in the ab face to a c axis is 5 or more, then dispersing nanoparticles in a liquid having a refractive index of 1.3 to 1.5 and a viscosity of 7 to 200 mm$^2$/s at 25° C. and then impregnating the pencil lead body with the liquid.

"The present invention" includes the respective embodiments of the first embodiment to the sixth embodiment, and in a case of the same constitution as that of the first embodiment, the explanations thereof shall be omitted by showing the fact to the effect in explanations subsequent to the first embodiment.

The flake graphite used in the first embodiment of the present invention has to have an ab face having a flatness of at least 2 μm or less, and an aspect ratio of the a axis or the b axis in the ab face to the c axis has to be 5 or more. From the viewpoints of the writing feeling and the writing resistance, preferred is the flake graphite which has an ab face having a flatness of at least 0.05 to 2 μm and in which an aspect ratio of an a axis or a b axis in the ab face to a c axis is 5 to 100.

The flake graphite which has a flatness exceeding 2 μm and in which an aspect ratio of an a axis or a b axis to a c axis is less than 5 provides a condition which is disadvantageous to lubrication and results in increasing friction, and that is not preferred.

In the first embodiment of the present invention, the flake graphite which can be used shall not specifically be restricted as long as it is flake graphite which has an ab face having a flatness of at least 2 μm or less and in which an aspect ratio of an a axis or a b axis in the ab face to a c axis is 5 or more which are the characteristics described above, and it can be selected from, for example, natural graphite, artificial graphite, kish graphite, expandable graphite, expanded graphite and the like which have the characteristics described above. They may be used alone or in combination of two or more kinds thereof.

The flake graphite in the first embodiment has preferably a volume average diameter (mv value) of 4 to 10 μm from the viewpoints of the strength and the writing feeling.

The volume average diameter (mv value) in the present invention (including the first embodiment to the sixth embodiment, examples described later and others) means an average diameter weighted by the volume on measuring results by a laser diffraction•dispersion method. In a case of, for example, flake graphite, it can be dry-measured by means of Microtrac (3100II, manufactured by Nikkiso Co., Ltd.), and in a case of nanoparticles described later, it can be measured by means of Nanotrac (UPA-EX150 (internal probe type), manufactured by Nikkiso Co., Ltd.).

In the first embodiment of the present invention, the flake graphite described above is used to form a lead body for forming a pencil lead. The lead body for forming a pencil lead can be formed by subjecting a blend composition for pencil lead containing the flake graphite described above to burning treatment or non-burning treatment.

In the first embodiment, the lead body for forming a pencil lead is prepared by using the blend composition for a pencil lead containing the flake graphite having the characteristics described above, and the respective components such as an extender, a lubricant, a binder component such as a thermoplastic synthetic resin and the like, an organic solvent and the like can suitably be selected and used for components other than the above flake graphite according to the kinds of the pencil lead.

For example, in a case where the pencil lead is a burned pencil lead for a mechanical pencil, at least carbon black and amorphous carbon can be added in addition to the flake graphite, and in a case of a non-burned pencil lead, at least oil & fat and waxes can be added. Further, in a case of a burned pencil lead, at least an extender and a ceramic binding material carbon can be added.

The carbon black which can be used includes, for example, oil furnace black, gas furnace black, channel black, thermal black, acetylene black, lamp black, graphitized carbon black which is obtained by graphitizing these carbon black and the like.

The extender shall not specifically be restricted as long as it is used for conventional pencil leads, and any ones can be used. For example, white extenders and color extenders such as boron nitride, kaolin (kaolinite, halloysite), montmorillonite, talc, mica, calcium carbonate and the like can be used as well, and naturally mixtures of plural kinds thereof can be used as well. Particularly preferably, it includes boron nitride, kaolin and talc in terms of physical properties and a form thereof.

The ceramic binding material includes crystalline or amorphous $SiO_2$, $Si_3N_4$, $Al_2O_3$, $ZrO_2$, MgO, BN, $B_2O_3$, AlN and the like. They may be used alone or in combination of two or more kinds thereof.

The thermoplastic synthetic resin includes, for example, polyvinyl alcohol, polyvinyl chloride, chlorinated polyvinyl chloride, polyamide, polyethylene, polypropylene, polyetheretherketone and the like.

The organic solvent is preferably a solvent which can dissolve the thermoplastic synthetic resins described above, and to be specific, capable of being used are dioctyl phthalate, dibutyl phthalate, tricresyl phosphate, dioctyl adipate, diallyl isophthalate, propylene carbonate, alcohols, ketones, esters and the like.

Also, in the burned pencil lead for a mechanical pencil, α-olefin oligomers, fatty acid esters, spindle oils, waxes, boron nitride, talc, silicone oils, silica fine particles, metal soaps and the like can be used as the other components. In the non-burned pencil lead or the burned pencil lead, silicone oils, lard, acryl resins, epoxy resins, celluloid, other thermoplastic resins and the like can be used as the other components.

In the first embodiment of the present invention, the foregoing blend composition for a pencil lead comprising the respective components (an extender, a thermoplastic resin, an organic solvent and the like) used, for example, for the burned pencil lead for a mechanical pencil, the non-burned pencil lead and the burned pencil lead are kneaded, molded, dried and subjected to burning treatment or non-burning treatment (drying at a low temperature of 50 to 120° C.) under non-oxidative atmosphere, whereby a lead body for a pencil lead can be formed.

A content of the flake graphite having the characteristics described above which is used for the above lead body for a pencil lead is preferably 20 to 80% by mass (hereinafter referred to merely as "%"), more preferably 30 to 70% based on the total amount of the blend composition for a pencil lead, and an optimum value thereof is varied according to the hardness.

If a content of the flake graphite is less than 20% or exceeds 80%, that results in breakage of balance between the hardness, the writing feeling and the strength, and therefore that is not preferred.

In the first embodiment of the present invention, for example, in a case of producing the burned pencil lead for a mechanical pencil, (a) 20 to 80% of the flake graphite having the characteristics described above, (b) 30 to 60% of the thermoplastic synthetic resin and (c) 0 to 30% of the organic solvent which can dissolve the thermoplastic synthetic resin based on the total amount of the blend composition for a pencil lead preferably in terms of the strength, the intensity and the writing feeling are dispersed and mixed by means of a Henschel mixer and kneaded by means of a pressure kneader or a double roll mill, and the kneaded mixture is molded by means of an extrusion molding machine; and the molded matter is then dried at 110 to 250° C. in an electric furnace and subsequently burned at 800 to 1400° C. for 20 to 40 hours under non-oxidative atmosphere (under nitrogen gas atmosphere or inert gas atmosphere), whereby a lead body for forming a pencil lead can be formed.

The pencil lead in the first embodiment of the present invention is obtained by dispersing nanoparticles in a liquid having a refractive index of 1.3 to 1.5 and a viscosity of 7 to 200 $mm^2$/s at 25° C. and then impregnating the pencil lead body formed above with the liquid.

The liquid used in the first embodiment of the present invention is used to build a structure in which the pores of the pencil lead body are impregnated with the nanoparticles to bring the nanoparticles into contact with an ab face of the flake graphite constituting the pencil lead body and to have the nanoparticles work as a lubricant as well as the purpose of enhancing the density of them, and it includes liquids having a refractive index of 1.3 to 1.5 and a viscosity of 7 to 200 $mm^2$/s at 25° C. in terms of easiness of impregnation thereof into the pores and a reflectance of light.

The liquid which can be used shall not specifically be restricted as long as it is a liquid having the characteristics described above, and it includes a single component or a mixture of two or more kinds of dimethyl silicone, dimethyl silicone oil, carboxymethyl cellulose (CMC) liquids, trimethylpentaphenyltrisiloxane, liquid paraffins, fatty acid esters and the like each having the characteristics described above. To be specific, it includes Hicall M series manufactured by Kaneda Co., Ltd., KF-96 series manufactured by Shin-Etsu Chemical Co., Ltd. and others which are commercially available.

The refractive index in the present invention (including examples and the like described later) means an absolute refractive index, and the dynamic viscosity means a value of a unit ($mm^2$/s) based on viscosity measuring methods prescribed in JIS K 2283 and JIS Z 8803 and can be measured directly by, for example, "Cannon Fenske" and "Ubbelohde".

When a refractive index of the above liquids is less than 1.3 or exceeds 1.5, contribution to reduction in the reflectance is small. Further, if a viscosity thereof is less than 7 $mm^2$/s, the liquid can not be retained in the lead body and flows out with the passage of time. On the other hand, if the viscosity exceeds 200 $mm^2$/s, the liquid is not penetrated evenly into the pores, and that is not preferred.

In the first embodiment of the present invention, the nanoparticles used shall not specifically be restricted, and any ones can be used as long as they are usually classified into nanoparticles. Capable of being used are, for example, diamond nanoparticles, carbon nanoparticles such as composite particles of carbon nanotubes and composite particles of fullerene, oxide ceramics of metals such as silicon, titanium, zirconium, aluminum, cerium and ceramic nanoparticles of nitride ceramics, phosphate ceramics, carbide ceramics, silicate ceramics, boride ceramics and the like.

When producing the pencil lead, carbon nanoparticles are preferred from the viewpoint of inhibiting a change in the hue, and diamond nanoparticles are particularly preferred from the viewpoint of obtaining the economical efficiency and the smooth writing property.

The diamond nanoparticles which can be used include, for example, diamond nanoparticles prepared by an explosion method, a hydrostatic method, an impact compression method, an EACVD method, a gas phase synthetic method and a liquid phase growing method, and a form thereof includes, for example, polycrystalline diamond particles, single crystal diamond particles, cluster diamond and the like.

To be specific, capable of being used are a trade name "NanoAmando B" manufactured by NanoCarbon Research Institute Co., Ltd., MD series manufactured by Tomei Diamond Co., Ltd., SCM Nanodiamond and SCM Fine Diamond manufactured by Sumiseki Materials Co., Ltd., CD (Cluster Diamond), CDS (Cluster Diamond Slurry), GCD (Graphite Cluster Diamond) and GCDS (Graphite Cluster Diamond Slurry) each manufactured by Nanotec-Systems Inc. and artificial diamonds manufactured by JERO Co., Ltd. and the like.

A sphericity of the nanoparticles used falls in a range of 1 to 20 nm, preferably 0.1 to 10 nm and more preferably 0.1 to 5 nm. In the present invention (including the first embodiment to the sixth embodiment, examples described later and others), "the sphericity" means the same one as prescribed in JIS B 1501 as a method for measuring a steel ball for a ball bearing. According to the method, the sphericity is determined by measuring contours of a ball surface of two or three equatorial planes of one steel ball to be measured which are crossed with each other at 90° by means of a roundness measuring machine and determining a maximum value of distances from the respective minimum circumscribed circles to the surface of the steel ball in a radial direction. Since the nanoparticles used in the first embodiment of the present invention are too fine, a sphericity thereof is not measured by the above method, and therefore it is to be measured based on JIS. The roundness is measured by image treatment to set it to a value of the sphericity, wherein the roundness is measured as a maximum value of distances from the minimum circumscribed circles to the surface of the steel ball in a radial direction only on one equatorial plane of ten particles observed on a SEM or TEM image.

The nanoparticles having a sphericity of less than 1 nm are not preferred in terms of an availability of the raw material, a cost, a handling property and the like. On the other hand, if the nanoparticles having a sphericity of exceeding 20 nm are used, the probability that a shape of the nanoparticles themselves is unsuitable as a solid lubricant is increased to bring about the steric hindrance, and that results in increasing the friction and is not preferred.

In the first embodiment of the present invention, a volume average diameter (mv value) of the nanoparticles used has to have a mv value of 0.01 to 2 based on 100 of a volume average diameter (mv value) of the graphite having the characteristics described above in the nanoparticles such as the nanoparticles comprising the ceramic materials described above and the carbon nanoparticles including the diamond nanoparticles in terms of combining pores (closed cells) with pores (closed cells) in the pencil lead in the production and further forming pores (open cells) of an open type, and it has preferably a mv value of 0.1 to 1.

A volume average diameter (mv value) of the nanoparticles used is preferably 4 to 100 nm, more preferably 5 to 40 nm and particularly preferably 5 to 30 nm.

If a volume average diameter (mv value) of the nanoparticles such as the nanomaterials comprising the ceramic materials and the carbon nanoparticles including the diamond nanoparticles is less than 0.05 based on 100 of a volume average diameter (mv value) of the graphite having the characteristics described above or a volume average diameter (mv value) of the nanoparticles is less than 4 nm, the particles are difficult to be monodispersed and liable to be coagulated, and they are increased in reactivity and become instable to result in exerting an inverse action on sliding of the graphite. On the other hand, if it exceeds 2 based on 100 of a volume average diameter (mv value) of the graphite having the characteristics described above or a volume average diameter (mv value) of the nanoparticles exceeds 100 nm, the pencil lead is broken in a structure and reduced in strength, and that is not preferred.

A trace amount of impurities is contained in the diamond nanoparticles described above, and almost all of them are $sp^3$ surface functional groups originating in the diamond structure and are components removed in dispersing of nanoparticles in oil. Impurities other than them account for about 0.2% and therefore do not exert an adverse influence on the effects of the present invention. Also, diamond having "a diamond purity of 99% or more" is a solid lubricant having a low frictional coefficient, and usually if impurities which are not a solid lubricant exceed 1% in a solid lubricant, a lubricating characteristic thereof starts being deteriorated.

A content of the nanoparticles having the above characteristics in the liquid is controlled so that a content of the nanoparticles in the pencil lead obtained by impregnation treatment is preferably 0.001 to 5%, more preferably 0.002 to 1% and particularly preferably 0.01 to 0.5%.

In order to control a content of the nanoparticles in the pencil lead obtained to the ranges described above, the nanoparticles are contained, though varied depending on a size, a pore diameter and a pore volume of the lead body, in a proportion of preferably 0.01 to 10%, more preferably 0.02 to 2% and particularly preferably 0.05 to 0.5% base on the total amount of the liquid used for impregnation treatment.

If a content of the nanoparticles in the above pencil lead is less than 0.001%, an effective pore volume thereof is scarcely varied, and a difference from a pencil lead to which the nanoparticles are not added is not observed. On the other hand, in order to prepare a lead in which a content of the nanoparticles exceeds 5%, an effective pore volume thereof has to be increased, but it allows the pencil lead to be notably reduced in strength. Further, a concentration of the nanoparticles in the dispersion for impregnation has to be enhanced, but it brings about scattering in a distribution amount of the nanoparticles in the lead body, and that is not preferred.

In the first embodiment of the present invention, the lead body is dipped as it is in a dispersion obtained by dispersing the nanoparticles having the characteristics described above in the liquid having the characteristics described above or subjected to dipping treatment and the like under applying pressure (for example, 0.5 to 5 MPa) and/or under heating (for example, liquid temperature of 60 to 200° C.), whereby obtained is the targeted pencil lead, that is, the pencil lead which contains the flake graphite having the characteristics described above and in which the nanoparticles having a mv value of 0.05 to 2 based on 100 of a volume average diameter (mv value) of the graphite and having a sphericity of 0.1 to 20 nm are brought into contact with the ab face of the above graphite.

The pencil lead obtained in the first embodiment contains the nanoparticles in the range described above, and it is a pencil lead provided with a suited abrasion characteristic by producing it by the production process described above. More preferred is the pencil lead in which a total frictional coefficient (dynamic frictional coefficient) obtained by dividing an average value (n=10) of total frictional forces in lines drawn by a drawing method using a drawing apparatus prescribed in JIS S 6005:2007 by a writing load is 0.191 to 0.218, and this makes it possible to obtain a lead by which smoother writing is felt as well in a mechanical pencil lead of a type in which a lead is rotated.

Also, when a polished cross section of the pencil lead is observed in an area of 5 μm×5 μm by means of FE-SEM (S-4700 model, accelerating voltage: 5 kV, current value: 10 μA, manufactured by Hitachi High-Technologies Corporation), 1 to 300 nanoparticles are preferably observed. In addition of the nanoparticles in "the more preferred range" described above, 2 to 100 particles are observed, and in addition thereof in "the particularly preferred range", 5 to 50 particles are observed.

The above total frictional coefficient and the number of the nanoparticles can be controlled by suitably combining the physical properties of the flake graphite used such as a flatness, an aspect ratio and a content thereof and a sphericity, a volume average diameter (mv value) and a content (impregnation amount) of the nanoparticles and the kind of the oil.

In the first embodiment of the present invention thus constituted, a blend composition for a pencil lead containing at least the flake graphite which has an ab face having a flatness of at least 2 μm or less and in which an aspect ratio of an a axis or a b axis in the ab face to a c axis is 5 or more is subjected to burning treatment, and then it is impregnated with the liquid containing the nanoparticles having a sphericity of 0.1 to 20 nm and a volume average diameter (mv value) falling in a specific range based on the graphite having the characteristics described above, whereby prepared is a state in which the nanoparticles are penetrated into the pores of a porous body constituted from the flake graphite having the characteristics described above (a state in which the nanoparticles are brought into contact with the ab face of the flake graphite). Thus, the properties of the pencil lead having a porous structure are different from those of conventional ones. To be specific, the nanoparticles contained in the liquid having the characteristics described above exert an effect of a suspension or a bearing, and therefore the lead is improved in lubrication to a larger extent than in a case where the nanoparticles are not added. This allows the pencil lead to be improved in lubrication to a large extent. Since penetration of the nanoparticles into the lead body allows the smooth drawn lines to bring about diffused reflection, so-called "shine" disappears, and it results in making the color dense. In addition thereto, friction between paper and the flake graphite particles and between the flake graphite particles themselves are reduced by the action of the flake graphite itself having the characteristics described above, and the erasability is enhanced as well. Further, since the nanoparticles can evenly be dispersed without disturbing orientation of the flake graphite having the characteristics described above, an effect thereof as an extender is exerted, and the compression strength is enhanced as well. Also, since an abrasion amount of the lead is small, an amount of the graphite contained in the drawn lines is small as well, and the fingers are less liable to be stained.

Further, in the first embodiment of the present invention, prepared is a pencil lead having, in addition to the action and effect described above, drawn line intensity, writing feeling and a low static•dynamic frictional coefficient which exceed those of the pencil leads disclosed in patent document 1 described above. In particular, even in a case of a pencil lead used for a mechanical pencil of a type in which a lead is rotated whenever written to always carry out writing by a fresh part, obtained are a pencil lead which has better and smoother writing feeling and which provides drawn lines with higher intensity and a brilliant black color and a production process for the same (this matter shall be explained in further details in Examples 1 to 6, Reference Example 1 and Comparative Examples 1 to 7 each described later).

The pencil lead prepared in the first embodiment of the present invention shall not be restricted to the first embodiment described above and can be varied in various manners and in the scope of the technical concept of the present invention. For example, it may be a pencil lead prepared such that the nanoparticles are adhered to an ab face of the graphite particles before forming the lead body obtained in the first embodiment described above, that is, the lead body prepared by subjecting a blend composition for a pencil lead containing at least the flake graphite having the characteristics described above to burning treatment or non-burning treatment, and then a lead body is formed and subjected to burning and impregnating treatment with a liquid containing the nanoparticles having the characteristics described above. In this case, the nanoparticles contained in the lead body and the nanoparticles contained in the liquid are completely independent from each other, and therefore the same or different nanoparticles may be used in different amounts. In this case, a preferred content of the nanoparticles is maximum 10% in the pencil lead.

Second Embodiment

A pencil lead which is the second embodiment of the present invention is a pencil lead containing flake graphite which has an ab face having a flatness of at least 2 μm or less and in which an aspect ratio of an a axis or a b axis in the ab face to a c axis is 5 or more, wherein nanoparticles having a mv value of 0.05 to 2 based on 100 of a volume average diameter (mv value) of the graphite and having a specific surface area of 50 to 800 $m^2/g$ are brought into contact with the ab face of the graphite.

Further, a production process for the pencil lead in the second embodiment of the present invention is characterized by forming a lead body of a pencil lead containing flake graphite which has an ab face having a flatness of at least 2 μm or less and in which an aspect ratio of an a axis or a b axis in the ab face to a c axis is 5 or more, then dispersing nanoparticles in a liquid having a refractive index of 1.3 to 1.5 and a viscosity of 7 to 200 $mm^2/s$ at 25° C. and then impregnating the above pencil lead body with the liquid.

The second embodiment of the present invention is different only in terms of using the nanoparticles having a my value of 0.05 to 2 based on 100 of a volume average diameter (mv value) of the flake graphite and having a specific surface area of 50 to 800 $m^2/g$ in place of the nanoparticles used in the first embodiment described above which have a mv value of 0.05 to 2 based on 100 of a volume average diameter (mv value) of the flake graphite and which have a sphericity of 0.1 to 20 nm, and use of the flake graphite other than the nanoparticles (described later) and formation of the lead body for forming a pencil lead by using the flake graphite are the same as in the first embodiment described above. Points different from the first embodiment described above shall be described below in detail, and explanations of the same constitution, production process and the like shall be omitted.

The pencil lead in the second embodiment of the present invention is obtained by forming a lead body in the same manner as in the first embodiment described above, dispersing the nanoparticles having a mv value of 0.05 to 2 based on 100 of a volume average diameter (mv value) of the graphite and having a specific surface area of 50 to 800 $m^2/g$ in the same liquid having a refractive index of 1.3 to 1.5 and a viscosity of 7 to 200 $mm^2/s$ at 25° C. as in the first embodiment and then impregnating the lead body with the liquid.

In the second embodiment, the nanoparticles used shall not specifically be restricted as long as they are usually classified into nanoparticles and have the characteristics described above, and any ones can be used. Capable of being used are, for example, diamond nanoparticles, carbon nanoparticles such as composite particles of carbon nanotubes and composite particles of fullerene, oxide ceramics of metals such as silicon, titanium, zirconium, aluminum, cerium and ceramic nanoparticles of nitride ceramics, phosphate ceramics, carbide ceramics, silicate ceramics, boride ceramics and the like.

When producing the pencil lead, carbon nanoparticles are preferred from the viewpoint of inhibiting a change in the hue, and diamond nanoparticles are particularly preferred from the viewpoint of obtaining the economical efficiency and the smooth writing property.

The diamond nanoparticles which can be used include, for example, diamond nanoparticles prepared by an explosion method, a hydrostatic method, an impact compression method, an EACVD method, a gas phase synthetic method and a liquid phase growing method, and a form thereof includes, for example, polycrystalline diamond particles, single crystal diamond particles, cluster diamond and the like.

To be specific, capable of being used are a trade name "NanoAmando B" manufactured by NanoCarbon Research Institute Co., Ltd., MD series manufactured by Tomei Diamond Co., Ltd., SCM Nanodiamond and SCM Fine Diamond manufactured by Sumiseki Materials Co., Ltd., CD (Cluster Diamond), CDS (Cluster Diamond Slurry), GCD (Graphite Cluster Diamond) and GCDS (Graphite Cluster Diamond Slurry) each manufactured by Nanotec-Systems Inc., artificial diamonds manufactured by JERO Co., Ltd. and the like.

A specific surface area of the nanoparticles used in the second embodiment falls in a range of 50 to 800 $m^2/g$, preferably 100 to 800 $m^2/g$ and more preferably 300 to 700 $m^2/g$. In the present invention (including examples described later and others), "the specific surface area" of the nanoparticles is shown by a BET specific surface area determined by a BET dynamic method. The BET specific surface area can be measured by means of, for example, a full automatic BET specific surface area measuring apparatus (HM model-1208) manufactured by Mountech Co., Ltd.

In the nanoparticles having a specific surface area of less than 50 $m^2/g$, nano-lubrication in a grain boundary of the graphite which is proposed in the present invention is not obtained, and it is not preferred in terms of availability of the raw materials, the cost, the handling property and the like. On the other hand, if the nanoparticles having a specific surface area of exceeding 800 $m^2/g$ are used, the probability that a form of the nanoparticles themselves are unsuitable as a solid lubricant is increased, and sliding lubrication which is proposed in the present invention is not obtained, so that that is not preferred.

In the second embodiment of the present invention, volume average diameter (mv value) of the nanoparticles used has to have, as is the case with the first embodiment described above, a mv value of 0.01 to 2 based on 100 of a volume average diameter (mv value) of the graphite having the characteristics described above in the nanoparticles such as the nanoparticles comprising the ceramic materials described above and the carbon nanoparticles including the diamond nanoparticles in terms of combining pores (closed cells) with pores (closed cells) in the pencil lead in the production and further forming pores (open cells) of an open type, and it is preferably a mv value of 0.1 to 1.

A volume average diameter (mv value) of the nanoparticles used is, as is the case with the first embodiment described above, preferably 4 to 100 nm, more preferably 5 to 40 nm and particularly preferably 5 to 30 nm.

A trace amount of impurities is contained in the diamond nanoparticles described above, and almost all of them are $sp^3$ surface functional groups originating in the diamond structure and are components removed in dispersing the nanoparticles in oil. Impurities other than them account for about 0.2% and therefore do not exert an adverse influence on the effects of the present invention. Also, diamond having "a diamond purity of 99% or more" is a solid lubricant having a low frictional coefficient, and usually if impurities which are not the solid lubricant exceed 1% in the solid lubricant, a lubricating characteristic thereof starts being deteriorated.

A content of the nanoparticles having the above characteristics in the liquid is controlled, as is the case with the first embodiment, so that a content of the nanoparticles in the pencil lead obtained by impregnation treatment is preferably 0.001 to 5%, more preferably 0.002 to 1% and particularly preferably 0.01 to 0.5%.

In order to control a content of the nanoparticles in the pencil lead obtained to the ranges described above, the nanoparticles are contained, though varied depending on a size, a pore diameter and a pore volume of the lead body, in a proportion of preferably 0.01 to 10%, more preferably 0.02 to 2% and particularly preferably 0.05 to 0.5% based on the total amount of the liquid used for impregnation treatment.

If a content of the nanoparticles in the above pencil lead obtained is less than 0.001%, an effective pore volume thereof is scarcely varied, and a difference from a pencil lead to which the nanoparticles are not added is not observed. On the other hand, in order to prepare a lead in which a content of the nanoparticles exceeds 5%, an effective pore volume thereof has to be increased, but it allows the pencil lead to be notably reduced in strength. Further, a concentration of the nanoparticles in the dispersion for impregnation has to be enhanced, but it brings about scattering in a distribution amount of the nanoparticles in the lead body, and that is not preferred.

In the second embodiment of the present invention, the pencil lead body is dipped as it is in a dispersion obtained by dispersing the nanoparticles having the characteristics described above in the liquid having the characteristics described above or subjected to dipping treatment and the like under applying pressure (for example, 0.5 to 5 MPa) and/or under heating (for example, liquid temperature: 60 to 200° C.), whereby obtained is the targeted pencil lead, that is, the pencil lead which contains the flake graphite having the characteristics described above and in which the nanoparticles having a mv value of 0.05 to 2 based on 100 of a volume average diameter (mv value) of the graphite and having a specific surface area of 50 to 800 $m^2/g$ are brought into contact with the ab face of the graphite.

The pencil lead obtained contains the nanoparticles in the range described above, and it is turned into a pencil lead provided with a suited abrasion characteristic and the like by producing it according to the production process described above. More preferred is the pencil lead in which a total frictional coefficient (dynamic frictional coefficient) obtained by dividing an average value (n=10) of total frictional forces in lines drawn by a drawing method using the drawing apparatus prescribed in JIS S 6005:2007 by a writing load is 0.191 to 0.218, and this makes it possible to obtain a lead by which smoother writing is felt as well in a mechanical pencil lead of a type in which a lead is rotated.

Also, when a polished cross section of the pencil lead is observed in an area of 5 μm×5 μm by means of FE-SEM (S-4700 model, accelerating voltage: 5 kV, current value: 10 μA, manufactured by Hitachi High-Technologies Corporation), 1 to 300 nanoparticles are preferably observed. In addition of the nanoparticles in "the more preferred range" described above, 2 to 100 particles are observed, and in addition thereof in "the particularly preferred range", 5 to 50 particles are observed.

The above total frictional coefficient and the number of the nanoparticles can be controlled by suitably combining the physical properties of the flake graphite used such as a flatness, an aspect ratio and a content thereof and a specific surface area, a volume average diameter (mv value) and a content (impregnation amount) of the nanoparticles and the kind of the oil.

In the second embodiment of the present invention thus constituted, a blend composition for a pencil lead containing at least the flake graphite which has an ab face having a flatness of at least 2 μm or less and in which an aspect ratio of an a axis or a b axis in the ab face to a c axis is 5 or more is subjected to burning treatment, and then it is impregnated with the liquid containing the nanoparticles having a specific surface area of 50 to 800 $m^2/g$ and a volume average diameter (mv value) falling in a specific range based on the graphite having the characteristics described above, whereby prepared is a state in which the nanoparticles are penetrated into the pores of a porous body constituted from the flake graphite having the characteristics described above (a state in which the nanoparticles are brought into contact with the ab face of the flake graphite). Thus, the properties of the pencil lead having a porous structure are different from those of conventional one. To be specific, the nanoparticles contained in the liquid having the characteristics described above exert an effect of a suspension or a bearing, and therefore the lead is improved in lubrication to a larger extent than in a case where the nanoparticles are not added. This allows the pencil lead to be improved in lubrication to a large extent. Since penetration of the nanoparticles into the lead body allows the smooth drawn lines to bring about diffused reflection, so-called "shine" disappears, and it results in obtaining the dense color. In addition thereto, friction between paper and the flake graphite particles and between the flake graphite particles themselves are reduced by the action of the flake graphite itself having the characteristics described above, and the erasability is enhanced. Further, since the nanoparticles can evenly be dispersed without disturbing orientation of the flake graphite having the characteristics described above, an effect thereof as an extender is exerted, and the compression strength is enhanced as well. Also, since an abrasion amount of the lead is small, an amount of the graphite contained in the drawn lines is small as well, and the fingers are less liable to be stained.

Further, in the present invention, prepared is a pencil lead having, in addition to the action and effect described above, drawn line intensity, writing feeling and a low static•dynamic frictional coefficient which exceed those of the pencil leads disclosed in patent document 1. In particular, even in a case of a pencil lead used for a mechanical pencil of a type in which a lead is rotated whenever written to always carry out writing by a fresh part, obtained are a pencil lead which has better and smoother writing feeling and which provides drawn lines with higher intensity and a brilliant black color and a production process for the same (this matter shall be explained in further details in Examples 7 to 12, Reference Example 2 and Comparative Examples 8 to 15 each described later).

The pencil lead prepared in the second embodiment of the present invention shall not be restricted to the second embodiment described above and can be varied in various manners and in the scope of the technical concept of the present invention. For example, it may be a pencil lead prepared such that the nanoparticles are adhered to an ab face of the graphite particles before forming the lead body obtained in the second embodiment described above, that is, the lead body prepared by subjecting a blend composition for a pencil lead containing at least the flake graphite having the characteristics described above to burning treatment or non-burning treatment, and then a lead body is formed and subjected to burning and impregnating treatment with a liquid containing the nanoparticles having the characteristics described above. In this case, the nanoparticles contained in the lead body and the nanoparticles contained in the liquid are completely independent from each other, and therefore the same or different nanoparticles may be used in different amounts. In this case, a preferred content of the nanoparticles is maximum 10% in the pencil lead.

Third Embodiment

A pencil lead which is the third embodiment of the present invention is a pencil lead containing flake graphite which has an ab face having a flatness of at least 2 μm or less and in which an aspect ratio of an a axis or a b axis in the ab face to a c axis is 5 or more, wherein nanoparticles having a mv value of 0.05 to 2 based on a volume average diameter (mv value) of the graphite and having a sphericity of 0.1 to 20 nm are adhered to the ab face of the graphite.

Further, a production process for the pencil lead in the third embodiment of the present invention is characterized by bringing flake graphite which has an ab face having a flatness of at least 2 μm or less and in which an aspect ratio of an a axis or a b axis in the ab face to a c axis is 5 or more into contact with nanoparticles having a mv value of 0.05 to 2 based on 100 of a volume average diameter (mv value) of the graphite and having a sphericity of 0.1 to 20 nm, then fixing the nanoparticles thereon to prepare a composite, forming a lead body by using the composite graphite and impregnating it with a liquid having a refractive index of 1.3 to 1.5 and a viscosity of 7 to 200 $mm^2/s$ at 25° C.

In the third embodiment of the present invention, the flake graphite and the nanoparticles each having the same physical properties as in the first embodiment are used, and it is different only in that the nanoparticles having a mv value of 0.05 to 2 based on 100 of a volume average diameter (mv value) of the graphite and having a sphericity of 0.1 to 20 nm are not brought into contact with but are adhered to the ab face of the graphite, and use of the flake graphite and the nanoparticles other than the above constitution are the same as in the first embodiment described above. Points different from the first embodiment shall be described below in detail, and explanations of the same constitution and the like shall be omitted.

In the third embodiment of the present invention, the flake graphite having the same characteristics as in the first embodiment is brought into contact with the nanoparticles; then the nanoparticles are fixed thereon to prepare a composite; and a lead body for a pencil lead is then formed by using the composite graphite.

The lead body for a pencil lead in the third embodiment can be formed by subjecting a blend composition for a pencil lead containing the composite graphite on which the nanoparticles are fixed to burning treatment or non-burning treatment.

In the third embodiment of the present invention, before forming the lead body for a pencil lead, the above flake graphite is brought into contact with the nanoparticles having the characteristics described above, and then the composite graphite on which the nanoparticles are fixed is prepared. As a result, the nanoparticles are dispersed on a whole part of the lead.

A method for preparing the composite graphite on which the nanoparticles are fixed includes, for example, a method in which the graphite is brought into contact with the nanoparticles by virtue of electrostatic force (electrostatic adhesion) to prepare a nanoparticle-fixed composite graphite, a method in which the nanoparticles are dispersed and adhered to the graphite by virtue of van der Waal's force to prepare a nanoparticle-fixed composite graphite and a method in which the nanoparticles are added while crushing the graphite to result in adhering the nanoparticles to the graphite by virtue of cohesive force exerted by van der Waal's force and the like.

The electrostatic adhesion described above is a method in which the nanoparticles are bonded with the graphite by accepting and donating electrons, and the disperse adhesion carried out by virtue of the van der Waal's force described above is a method in which the nanoparticles are bonded with the graphite by virtue of intermolecular force originating in a polarizing action in the graphite and the nanoparticles.

To be specific, it can be prepared by putting the flake graphite and the nanoparticles each described above into a Henschel mixer rotated at a high speed to prepare a nanoparticle-fixed composite graphite, putting an aqueous dispersion of the nanoparticles and the flake graphite into a Henschel mixer rotated at a high speed and vaporizing water with heat generated by frictional force between the particles to prepare a nanoparticle-fixed composite graphite, putting the graphite into a NPA (n-propyl alcohol) dispersion of the nanoparticles to carry out disperse adhesion by dry coating, applying a polycation agent on the graphite to carry out electrostatic adhesion to prepare a composite of the nanoparticles or mixing the graphite and the nanoparticles by means of a vibration ball mill to prepare a composite of the nanoparticles while crushing the graphite.

In terms of the adhesive force and the lubrication effect, the graphite having the characteristics described above is preferably brought into contact with the nanoparticles having the characteristics described above by virtue of electrostatic force (electrostatic adhesion) to prepare a nanoparticle-fixed composite graphite.

The flake graphite having the characteristics described above which is used for forming the above lead body for a pencil lead is turned to a nanoparticle-fixed composite graphite before forming the lead body and used, and a content of the flake graphite is preferably 20 to 80%, more preferably 30 to 70% based on the total amount of the blend composition for a pencil lead. An optimum value thereof is varied according to the hardness.

If a content of the above flake graphite is less than 20% or exceeds 80%, that results in breakage of balance between the hardness, the writing feeling and the strength, and therefore that is not preferred.

Further, the nanoparticles having the characteristics described above are used in the form of a nanoparticle-fixed composite graphite, and a content thereof is controlled so that a content of the nanoparticles in the pencil lead obtained by impregnation treatment is preferably 0.001 to 5%, more preferably 0.01 to 1% and particularly preferably 0.02 to 0.5% based on the total amount of the blend composition for a pencil lead.

If a content of the nanoparticles is less than 0.001%, an effective pore volume thereof is scarcely varied, and a difference from a pencil lead to which the nanoparticles are not added is not observed. On the other hand, if a content of the nanoparticles exceeds 5%, an effective pore volume thereof is increased, but the pencil lead is broken in a structure and reduced in strength, and therefore that is not preferred.

In the third embodiment of the present invention, the lead body for a pencil lead is prepared by using the blend composition containing for a pencil lead the composite graphite on which the nanoparticles having the characteristics described above are fixed, and the respective components such as an extender, a lubricant, a binder component such as a thermoplastic synthetic resin, an organic solvent and the like can suitably be selected, and used for components other than the above composite graphite on which the nanoparticles are fixed according to the kinds of the pencil lead as is the case with the first embodiment.

In the third embodiment of the present invention, the foregoing blend composition for a pencil lead comprising the respective components (an extender, a thermoplastic resin, an organic solvent and the like) used, for example, for the burned pencil lead for a mechanical pencil, the non-burned pencil lead and the burned pencil lead are kneaded, molded, dried and subjected to burning treatment or non-burning treatment (drying at a low temperature of 50 to 120° C.) under non-oxidative atmosphere, whereby a lead body for a pencil lead can be formed.

In the third embodiment of the present invention, for example, in a case of producing the burned pencil lead for a mechanical pencil, preferably in terms of the strength, the intensity and the writing feeling, as is the case with the first embodiment, (a) 20 to 80% of the flake graphite having the characteristics described above and (b) 0.01 to 5% of the nanoparticles having the characteristics described above which are brought into contact with the flake graphite having the characteristics described above and are then fixed thereon to prepare a composite; (c) 30 to 60% of the thermoplastic synthetic resin and (d) 0 to 30% of the organic solvent which can dissolve the above thermoplastic synthetic resin based on the total amount of the blend composition for a pencil lead are dispersed and mixed by means of a Henschel mixer and kneaded by means of a pressure kneader or a double roll mill, and the kneaded mixture is molded by means of an extrusion molding machine; and the molded matter is then dried at 110 to 250° C. in an electric furnace and subsequently burned at 800 to 1400° C. for 20 to 40 hours under non-oxidative atmosphere (under nitrogen gas atmosphere or inert gas atmosphere), whereby a lead body for forming a pencil lead can be formed.

The pencil lead in the third embodiment of the present invention is obtained by impregnating, as is the case with the first embodiment, the lead body formed above with a liquid having a refractive index of 1.3 to 1.5 and a viscosity of 7 to 200 $mm^2/s$ at 25° C.

In the third embodiment of the present invention, the pencil lead is dipped as it is in the liquid having the characteristics described above or subjected to dipping treatment and the like under applying pressure (for example, 0.5 to 5 MPa) and/or under heating (for example, liquid temperature: 60 to 200° C.), whereby obtained is the targeted pencil lead, that is, the pencil lead which contains the graphite having the characteristics described above and in which the nanoparticles having a mv value of 0.05 to 2 based on 100 of a volume average diameter (mv value) of the graphite and having a sphericity of 0.1 to 20 nm are adhered to the ab face of the graphite.

The pencil lead obtained is turned into a pencil lead provided with a suited abrasion characteristic and the like by producing it according to the production process described above. More preferred is the pencil lead in which a dynamic frictional coefficient obtained by dividing an average value (n=10) of total frictional forces in lines drawn by a drawing method using a drawing apparatus prescribed in JIS S 6005: 2007 by a writing load is 0.191 to 0.218, and this makes it possible to obtain a lead by which smoother writing is felt as well in a mechanical pencil lead of a type in which a lead is rotated.

Also, when a polished cross section of the pencil lead is observed in an area of 5 μm×5 μm by means of FE-SEM (S-4700 model, accelerating voltage: 5 kV, current value: 10 μA, manufactured by Hitachi High-Technologies Corporation), 1 to 300 nanoparticles are preferably observed. In addition of the nanoparticles in "the more preferred range" described above, 2 to 100 particles are observed, and in addition thereof in "the particularly preferred range", 5 to 50 particles are observed.

The above total frictional coefficient and the number of the nanoparticles can be controlled by suitably combining the physical properties of the flake graphite used such as a flatness, an aspect ratio and a content thereof and a sphericity, a volume average diameter (mv value) and a content (impregnation amount) of the nanoparticles and the kind of the oil.

In the third embodiment of the present invention thus constituted, the flake graphite which has an ab face having a flatness of at least 2 μm or less and in which an aspect ratio of an a axis or a b axis in the ab face to a c axis is 5 or more is brought into contact with the nanoparticles having a mv value of 0.05 to 2 based on 100 of a volume average diameter (mv value) of the graphite and having a sphericity of 0.1 to 20 nm; then the nanoparticles are fixed thereon to prepare a composite; a lead body is formed by using a blend composition for a pencil lead containing the composite graphite, and the lead body for a pencil lead is then impregnated with the liquid having the characteristic described above, whereby prepared is a state in which the nanoparticles are penetrated into the pores of a porous body constituted from the flake graphite having the characteristics described above (a state in which the nanoparticles are adhered to the ab face of the flake graphite). Thus, the properties of the pencil lead having a porous structure are different from those of conventional ones. To be specific, the nanoparticles having the characteristics described above play a role of a suspension or a bearing, and therefore the lead is improved in lubrication to a larger extent than in a case where the nanoparticles are not added. This allows the pencil lead to be improved in lubrication to a large extent. Further, since penetration of the nanoparticles into the lead body allows the smooth drawn lines to bring about diffused reflection, so-called "shine" disappears, and it results in making the color dense. In addition thereto, friction between paper and the flake graphite particles and between the flake graphite particles themselves are reduced by the action of the flake graphite itself having the characteristics described above, and the erasability is enhanced. Further, since the nanoparticles can evenly be dispersed without disturbing orientation of the flake graphite having the characteristics described above, an effect thereof as an extender is exerted, and the compression strength is enhanced as well. Also, since an abrasion amount of the lead is small, an amount of the graphite contained in the drawn lines is small as well, and the fingers are less liable to be stained.

Further, in the third embodiment of the present invention, prepared is a pencil lead having, in addition to the action and effect described above, drawn line intensity, writing feeling and a low static•dynamic frictional coefficient which exceed those of the pencil leads disclosed in patent document 1 described above. In particular, even in a case of a pencil lead used for mechanical pencils of a type in which a lead is rotated whenever written to always carry out writing by a fresh part, obtained are a pencil lead which has better and smoother writing feeling and which provides drawn lines with higher intensity and a brilliant black color and a production process for the same (this matter shall be explained in further details in Examples 13 to 18 and Comparative Examples 16 to 22 each described later).

The pencil lead prepared in the third embodiment of the present invention shall not be restricted to the third embodiment described above and can be varied in various manners and in the scope of the technical concept of the present invention. For example, it may be a pencil lead prepared by filling a liquid containing the nanoparticles having the characteristics described above into the lead body obtained in the third embodiment described above, that is, the lead body prepared by subjecting a blend composition for a pencil lead containing at least the composite flake graphite on which the nanoparticles having the characteristics described above are fixed to burning treatment or non-burning treatment. In this case, the nanoparticles contained in the lead body and the nanoparticles contained in the liquid are completely independent from each other, and therefore the same or different nanoparticles may be used in different amounts. In this case, a preferred content of the nanoparticles is maximum 10% in the pencil lead.

Fourth Embodiment

A pencil lead which is the fourth embodiment of the present invention is a pencil lead containing flake graphite which has an ab face having a flatness of at least 2 μm or less and in which an aspect ratio of an a axis or a b axis in the ab face to a c axis is 5 or more, wherein nanoparticles having a mv value of 0.05 to 2 based on 100 of a volume average diameter (mv value) of the graphite and having a specific surface area of 50 to 800 m$^2$/g are adhered to the ab face of the graphite.

Further, a production process for the pencil lead in the fourth embodiment of the present invention is characterized by bringing flake graphite which has an ab face having a flatness of at least 2 μm or less and in which an aspect ratio of an a axis or a b axis in the ab face to a c axis is 5 or more into contact with nanoparticles having a mv value of 0.05 to 2 based on 100 of a volume average diameter (mv value) of the graphite and having a specific surface area of 50 to 800 m$^2$/g, then fixing the nanoparticles thereon to prepare a composite, forming a lead body by using the composite graphite and impregnating it with a liquid having a refractive index of 1.3 to 1.5 and a viscosity of 7 to 200 mm$^2$/s at 25° C.

The fourth embodiment of the present invention is different only in terms of using the nanoparticles having a my value of 0.05 to 2 based on 100 of a volume average diameter (mv value) of the flake graphite and having a specific surface area of 50 to 800 m$^2$/g in place of the nanoparticles used in the third embodiment described above which have a mv value of 0.05 to 2 based on 100 of a volume average diameter (mv value) of the flake graphite described above and which have a sphericity of 0.1 to 20 nm and allowing the nanoparticles to be adhered to the ab face of the graphite. Also, the nanoparticles used in the second embodiment are used as well for the nanoparticles. Accordingly, points different from the first embodiment and the third embodiment shall be described below in detail, and explanations of the same constitution, production process and the like as the above respective embodiments shall be omitted.

In the fourth embodiment of the present invention, the lead body is dipped as it is in the liquid having the same characteristics as in the first embodiment to the third embodiment described above or subjected to dipping treatment and the like under applying pressure (for example, 0.5 to 5 MPa) and/or under heating (for example, liquid temperature: 60 to 200°

C.), whereby obtained is the targeted pencil lead, that is, the pencil lead which contains the graphite having the characteristics described above and in which the nanoparticles having a mv value of 0.05 to 2 based on 100 of a volume average diameter (mv value) of the graphite and having a specific surface area of 50 to 800 m$^2$/g are adhered to the ab face of the graphite.

The pencil lead obtained is turned into a pencil lead provided with a suited abrasion characteristic and the like by producing it by the production process described above. More preferred is the pencil lead in which a dynamic frictional coefficient obtained by dividing an average value (n=10) of total frictional forces in lines drawn by a drawing method using a drawing apparatus prescribed in JIS S 6005:2007 by a writing load is 0.191 to 0.218, and this makes it possible to obtain a lead by which smoother writing is felt as well in a mechanical pencil lead of a type in which a lead is rotated.

Also, when a polished cross section of the pencil lead is observed in an area of 5 μm×5 μm by means of FE-SEM (S-4700 model, accelerating voltage: 5 kV, current value: 10 μA, manufactured by Hitachi High-Technologies Corporation), 1 to 300 nanoparticles are preferably observed. In addition of the nanoparticles in "the more preferred range" described above, 2 to 100 particles are observed, and in addition thereof in "the particularly preferred range", 5 to 50 particles are observed.

The above total frictional coefficient and the number of the nanoparticles can be controlled by suitably combining the physical properties of the flake graphite used such as a flatness, an aspect ratio and a content thereof and a sphericity, a volume average diameter (mv value) and a content (impregnation amount) of the nanoparticles and the kind of the oil.

In the fourth embodiment of the present invention thus constituted, the flake graphite which has an ab face having a flatness of at least 2 μm or less and in which an aspect ratio of an a axis or a b axis in the ab face to a c axis is 5 or more is brought into contact with the nanoparticles having a mv value of 0.05 to 2 based on 100 of a volume average diameter (mv value) of the graphite and having a specific surface area of 50 to 800 m$^2$/g; then the nanoparticles are fixed thereon to prepare a composite; a lead body is formed by using a blend composition for a pencil lead containing the above composite graphite, and the lead body for a pencil lead is then impregnated with the liquid having the characteristic described above, whereby prepared is a state in which the nanoparticles are penetrated into the pores of a porous body constituted from the flake graphite having the characteristics described above (a state in which the nanoparticles are adhered to the ab face of the flake graphite). Thus, the properties of the pencil lead having a porous structure are different from those of conventional ones. To be specific, the nanoparticles having the characteristics described above play a role of a suspension or a bearing, and therefore the lead is improved in lubrication to a larger extent than in a case where the nanoparticles are not added. This allows the pencil lead to be improved in lubrication to a large extent. Further, since penetration of the nanoparticles into the lead body allows the smooth drawn lines to bring about diffused reflection, so-called "shine" disappears, and it results in making the color dense. In addition thereto, friction between paper and the flake graphite particles and between the flake graphite particles themselves are reduced by the action of the flake graphite itself having the characteristics described above, and the erasability is enhanced. Further, since the nanoparticles can evenly be dispersed without disturbing orientation of the flake graphite having the characteristics described above, an effect thereof as an extender is exerted, and the compression strength is enhanced as well.

Also, since an abrasion amount of the lead is small, an amount of the graphite contained in the drawn lines is small as well, and the fingers are less liable to be stained.

Further, in the present invention, prepared is a pencil lead having, in addition to the action and effect described above, drawn line intensity, writing feeling and a low static•dynamic frictional coefficient which exceed those of the pencil leads disclosed in patent document 1 described above. In particular, even in a case of a pencil lead used for a mechanical pencil of a type in which a lead is rotated whenever written to always carry out writing by a fresh part, obtained are a pencil lead which has better and smoother writing feeling and which provides drawn lines with higher intensity and a brilliant black color and a production process for the same (this matter shall be explained in further details in Examples 19 to 24 and Comparative Examples 23 to 30 each described later).

The pencil lead prepared in the fourth embodiment of the present invention shall not be restricted to the fourth embodiment described above and can be varied in various manners and in the scope of the technical concept of the present invention. For example, it may be a pencil lead prepared by filling a liquid containing the nanoparticles having the characteristics described above into the lead body obtained in the fourth embodiment described above, that is, the lead body prepared by subjecting a blend composition for a pencil lead containing at least the composite flake graphite on which the nanoparticles having the characteristics described above are fixed to burning treatment or non-burning treatment. In this case, the nanoparticles contained in the lead body and the nanoparticles contained in the liquid are completely independent from each other, and therefore the same or different nanoparticles may be used in different amounts. In this case, a preferred content of the nanoparticles is maximum 10% in the pencil lead.

Fifth Embodiment

The fifth embodiment and the sixth embodiment of the present invention are production processes for obtaining pencil leads which can exert the same action and effect as those of the pencil leads prepared in the first embodiment to the fourth embodiment each described above.

The fifth embodiment of the present invention is characterized by dispersing flake graphite which has an ab face having a flatness of at least 2 μm or less and in which an aspect ratio of an a axis or a b axis in the ab face to a c axis is 5 or more and nanoparticles having a mv value of 0.05 to 2 based on 100 of a volume average diameter (mv value) of the graphite and having a sphericity of 0.1 to 20 nm in a plasticizer or a solvent, kneading the dispersion and then forming a lead body from the kneaded matter.

The fifth embodiment of the present invention uses the flake graphite and the nanoparticles each used in the first embodiment described above and is different in a production process thereof, and the flake graphite and the nanoparticles each used are the same as in the first embodiment. Points different from the first embodiment shall be described below in detail, and explanations of the same constitution and the like shall be omitted.

In the fifth embodiment of the present invention, plasticizers used for producing pencil leads can be used, and they include, for example, at least one of dioctyl phthalate, dibutyl phthalate, tricresyl phosphate, dioctyl adipate, diallyl isophthalate, propylene carbonate, dioctyl adipate, diisononyl adipate, trioctyl trimellitate, tricresyl phosphate, tributyl acetylcitrate and the like.

Also, in the fifth embodiment of the present invention, solvents which can dissolve the plasticizers described above are preferred as the solvent used, and to be specific, at least one of alcohols, ketones, esters, ethers, aromatic hydrocarbons, aliphatic hydrocarbons, siloxanes and the like can be used.

In the fifth embodiment of the present invention, the flake graphite having the characteristics described above and the nanoparticles having the characteristics described above are dispersed in a solvent or a plasticizer or a plasticizer and a solvent and kneaded, and then a blend composition for a pencil lead which is the kneaded matter is subjected to burning treatment or non-burning treatment, whereby a lead body can be formed.

Apparatuses by which a solvent and a powder can evenly be dispersed, such as a Henschel mixer, a ball mill, a bead mill, a homogenizer, Nanomizer, Hivis Mix can be used for the dispersing method.

A content of the flake graphite having the characteristics described above which is used for forming the above lead body for a pencil lead is preferably 20 to 80%, more preferably 30 to 70% based on the total amount of the blend composition for a pencil lead. An optimum value thereof is varied according to the hardness.

If a content of the flake graphite is less than 20% or exceeds 80%, it results in breakage of balance between the hardness, the writing feeling and the strength, and therefore that is not preferred.

Further, a content of the nanoparticles having the characteristics described is controlled so that a content of the nanoparticles in the pencil lead obtained by impregnation treatment is preferably 0.001 to 5%, more preferably 0.01 to 1% and particularly preferably 0.02 to 0.5% based on the total amount of the blend composition for a pencil lead.

If a content of the above nanoparticles is less than 0.001%, an effective pore volume thereof is scarcely varied, and a difference from a pencil lead to which the nanoparticles are not added does not appear. On the other hand, if a content of the nanoparticles exceeds 5%, an effective pore volume thereof is increased, but the pencil lead is broken in a structure and reduced in strength, and therefore that is not preferred.

A content of the plasticizer described above is preferably 5 to 50%, more preferably 10 to 30% based on the total amount of the blend composition for a pencil lead which is the kneaded matter in terms of moldability, dispersibility of the nanoparticles and a quality of the finished lead.

Also, a content of the solvent described above is preferably 1 to 30%, more preferably 10 to 20% based on the total amount of the blend composition for a pencil lead which is the kneaded matter in terms of moldability, dispersibility of the nanoparticles, a quality of the finished lead and a blend amount of the plasticizer.

In the fifth embodiment of the present invention, the flake graphite having the characteristics described above and the nanoparticles having the characteristics described above are dispersed in a solvent or a plasticizer or a solvent and a plasticizer and kneaded, and then a blend composition for a pencil lead which is the kneaded matter is used for a pencil lead. The respective components such as an extender, a lubricant other than the above nanoparticles, the flake graphite, the plasticizer and the solvent can suitably selected and used according to the kind of the pencil lead and the like.

In a case where the pencil lead is, for example, a burned pencil lead for a mechanical pencil, at least carbon black and amorphous carbon in addition to the flake graphite can be contained therein as is the case with the first embodiment described above. Also, in a case of a non-burned pencil lead, at least oil & fat and waxes can be contained therein, and in a case of a burned pencil lead, at least an extender and a ceramic binder can be contained therein.

In the fifth embodiment of the present invention, the blend composition for a pencil lead which is the kneaded matter described above and comprises the respective components (the respective components such as the extender) used for, for example, the burned pencil lead for a mechanical pencil, the non-burned pencil lead and the burned pencil lead are kneaded, molded, dried and subjected to burning treatment or non-burning treatment (drying at low temperature of 50 to 120° C.) under non-oxidative atmosphere, whereby a lead body can be formed.

Also, in the fifth embodiment of the present invention, for example, in a case of producing the burned pencil lead for a mechanical pencil, preferably in terms of the strength, the intensity and the writing feeling, (a) 20 to 80% of the flake graphite having the characteristics described above, (b) 0.01 to 5% of the nanoparticles having the characteristics described above, (c) 5 to 50% of the plasticizer and 0 to 30% of the solvent and (d) 30 to 60% of the thermoplastic synthetic resin based on the total amount of the blend composition for a pencil lead are dispersed and mixed by means of a Henschel mixer and kneaded by means of a pressure kneader or a double roll mill, and the kneaded matter is molded by means of an extrusion molding machine; and the molded matter is then dried at 110 to 250° C. in an electric furnace and subsequently burned at 800 to 1400° C. for 20 to 40 hours under non-oxidative atmosphere (under nitrogen gas atmosphere or inert gas atmosphere), whereby a lead body for forming a pencil lead can be formed.

In the fifth embodiment of the present invention, the pencil lead is obtained by the production process described above, and a clearance formed between the flake graphites by the nanoparticles is preferably impregnated with the same liquid as in the first embodiment described above which has a refractive index of 1.3 to 1.5 and a viscosity of 7 to 200 mm$^2$/s at 25° C. after forming the pencil lead preferably in terms of the intensity, the writing feeling and the erasing performance.

The liquid used in the fifth embodiment of the present invention is used in order to act as a lubricant as well as for the purpose of enhancing the intensity, and the liquid having a refractive index of 1.3 to 1.5 and a viscosity of 7 to 200 mm$^2$/s at 25° C. is used in terms of easiness of penetration into pores and reflectance of light.

In the fifth embodiment of the present invention, the lead body is dipped as it is in the liquid having the characteristics described above or subjected to dipping treatment and the like under applying pressure (for example, 0.5 to 5 MPa) and/or under heating (for example, liquid temperature: 60 to 200° C.), whereby a more preferred pencil lead is obtained.

The pencil lead obtained by the production process in the fifth embodiment (including a sixth embodiment described later) of the present invention is turned into a pencil lead having a suited abrasion characteristic and the like. More preferred is the pencil lead in which a total frictional coefficient (dynamic frictional coefficient) obtained by dividing an average value (n=10) of total frictional forces in lines drawn by a drawing method using the drawing apparatus prescribed in JIS S 6005:2007 by a writing load is 0.191 to 0.218, and this makes it possible to obtain a lead by which smoother writing is felt as well in a mechanical pencil lead of a type in which a lead is rotated.

Also, when a polished cross section of the pencil lead is observed in an area of 5 μm×5 μm by means of FE-SEM (S-4700 model, accelerating voltage: 5 kV, current value: 10 μA, manufactured by Hitachi High-Technologies Corporation), 1 to 300 nanoparticles are preferably observed. In addition of the nanoparticles in "the more preferred range" described above, 2 to 100 particles are observed, and in addition thereof in "the particularly preferred range", 5 to 50 particles are observed (the same shall apply to the sixth embodiment described later).

The above total frictional coefficient and the number of the nanoparticles can be controlled by suitably combining the physical properties of the flake graphite used such as a flatness, an aspect ratio and a content thereof and a sphericity, a volume average diameter (mv value) and a content (impregnation amount) of the nanoparticles and the kind of the oil.

In the production process in the fifth embodiment of the present invention thus constituted, the flake graphite which has an ab face having a flatness of at least 2 μm or less and in which an aspect ratio of an a axis or a b axis in the ab face to a c axis is 5 or more and the nanoparticles having a mv value of 0.05 to 2 based on 100 of a volume average diameter (mv value) of the graphite and having a sphericity of 0.1 to 20 nm are dispersed in a plasticizer or a solvent and kneaded, and then a lead body is formed from the kneaded matter. Then, preferably a clearance formed between the flake graphites by the nanoparticles is impregnated with the liquid having a refractive index of 1.3 to 1.5 and a viscosity of 7 to 200 mm$^2$/s at 25° C., whereby prepared is a state in which the nanoparticles are penetrated into the pores of a porous body constituted from the flake graphite having the characteristics described above (a state in which the nanoparticles are brought into contact with a gap between the flake graphites). Thus, the properties of the pencil lead having a porous structure are different from those of conventional ones. To be specific, the nanoparticles having the characteristics described above play a role of a suspension or a bearing, and therefore the lead is improved in lubrication to a larger extent than in a case where the nanoparticles are not added. This allows the pencil lead to be improved in lubrication to a large extent. Further, since penetration of the nanoparticles into the lead body allows the smooth drawn lines to bring about diffused reflection, so-called "shine" disappears, and it results in making the color dense. In addition thereto, friction between paper and the flake graphite particles and between the flake graphite particles themselves is reduced by the action of the flake graphite having the characteristics described above, and the erasability is enhanced. Further, since the nanoparticles can be adhered without disturbing orientation of the flake graphite having the characteristics described above, an effect thereof as an extender is exerted, and the compression strength is enhanced as well. Also, since an abrasion amount of the lead is small, an amount of the graphite contained in the drawn lines is small as well, and the fingers are less liable to be stained.

Further, in the production process in the fifth embodiment of the present invention, prepared is a pencil lead having, in addition to the action and effect described above, drawn line intensity, writing feeling and a low static•dynamic frictional coefficient which exceed those of the pencil leads disclosed in patent document 1 described above. In particular, even in a case of a pencil lead used for a mechanical pencil of a type in which a lead is rotated whenever written to always carry out writing by a fresh part, obtained are a pencil lead which has better and smoother writing feeling and which provides drawn lines with higher intensity and a brilliant black color and a production process for the same (this matter shall be explained in further details in Examples 25 to 31 and Comparative Examples 31 to 37 each described later).

The production process for the pencil lead in the fifth embodiment of the present invention shall not be restricted to the fifth embodiment described above and can be varied in various manners and in the scope of the technical concept of the present invention. For example, it may be a pencil lead prepared by forming the lead body obtained in the fifth embodiment described above and then further filling it with the liquid having the characteristics described above which contains the nanoparticles having the characteristics described above. In this case, the nanoparticles contained in the lead body and the nanoparticles contained in the liquid are completely independent from each other, and therefore the same or different nanoparticles may be used in different amounts. In this case, a preferred content of the nanoparticles is maximum 10% in the pencil lead.

Sixth Embodiment

The sixth embodiment of the present invention is a production processes for obtaining a pencil lead which can exert the same action and effect as those of the pencil leads prepared in the first embodiment to the fourth embodiment each described above, and it is characterized by dispersing flake graphite which has an ab face having a flatness of at least 2 μm or less and in which an aspect ratio of an a axis or a b axis in the ab face to a c axis is 5 or more and nanoparticles having a mv value of 0.05 to 2 based on 100 of a volume average diameter (mv value) of the graphite and having a specific surface area of 50 to 800 m$^2$/g in a plasticizer or a solvent, kneading and then forming a lead body from the kneaded matter.

The sixth embodiment of the present invention is different in terms of using the nanoparticles having a mv value of 0.05 to 2 based on 100 of a volume average diameter (mv value) of the graphite and having a specific surface area of 50 to 800 m$^2$/g which are used in the second embodiment (and the fourth embodiment) in place of the nanoparticles used in the fifth embodiment described above. Points different from the fifth embodiment described above shall be described below in detail, and explanations of the same constitution and the like shall be omitted.

In the production process in the sixth embodiment of the present invention, the graphite which has an ab face having a flatness of at least 2 μm or less and in which an aspect ratio of an a axis or a b axis in the ab face to a c axis is 5 or more is brought into contact with the nanoparticles having a mv value of 0.05 to 2 based on 100 of a volume average diameter (mv value) of the graphite and having a specific surface area of 50 to 800 m$^2$/g, and then the nanoparticles having the characteristics described above are dispersed, as is the case with the fifth embodiment described above, in a plasticizer or a solvent and kneaded; a lead body is then formed from the kneaded matter. Then, preferably a clearance formed between the flake graphites by the nanoparticles is impregnated with the liquid having a refractive index of 1.3 to 1.5 and a viscosity of 7 to 200 mm$^2$/s at 25° C., whereby prepared is a state in which the nanoparticles are penetrated into the pores of a porous constituted from the flake graphite having the characteristics described above (a state in which the nanoparticles are brought into contact with a gap between the flake graphites). Thus, the properties of the pencil lead having a porous structure are different from those of conventional ones. To be specific, the nanoparticles having the characteristics described above play a role of a suspension or a bearing, and therefore the lead is improved in lubrication to a larger extent than in a case where the nanoparticles are not added. This allows the pencil lead to be improved in lubrication to a large extent. Further, since penetration of the nanoparticles into the lead body allows the smooth drawn lines to bring about diffused reflection, so-called "shine" disappears, and it results in making the color dense. In addition thereto, friction between paper and the flake graphite particles and between the flake graphite particles themselves is reduced by the action of the flake graphite itself having the characteristics described above, and the erasability is enhanced. Further, since the nanoparticles can evenly be dispersed without disturbing orientation of the flake graphite having the characteristics described above, an effect thereof as an extending is exerted, and the compression strength is enhanced as well. Also, since an abrasion amount of the lead is small, an amount of the graphite contained in the drawn lines is small as well, and the fingers are less liable to be stained.

Further, in the sixth embodiment of the present invention, prepared is a pencil lead having, in addition to the action and effect described above, drawn line intensity, writing feeling and a low static•dynamic frictional coefficient which exceed those of the pencil leads disclosed in patent document 1 described above. In particular, even in a case of a pencil lead used for a mechanical pencil of a type in which a lead is rotated whenever written to always carry out writing by a fresh part, obtained are a pencil lead which has better and smoother writing feeling and which provides drawn lines with higher intensity and a brilliant black color and a production process for the same (this matter shall be explained in further details in Examples 32 to 38 and Comparative Examples 38 to 45 each described later).

The production process for the pencil lead in the sixth embodiment of the present invention shall not be restricted to the sixth embodiment described above and can be varied in various manners and in the scope of the technical concept of the present invention. For example, it may be a pencil lead prepared by forming the lead body obtained in the sixth embodiment described above and then further filling it with the liquid having the characteristics described above which contains the nanoparticles having the characteristics described above. In this case, the nanoparticles contained in the lead body and the nanoparticles contained in the liquid are completely independent from each other, and therefore the same or different nanoparticles may be used in different amounts. In this case, a preferred content of the nanoparticles is maximum 10% in the pencil lead.

EXAMPLES

Next, the present invention shall be explained in further details by every respective embodiments (the first embodiment to the sixth embodiment) with reference to examples, reference examples and comparative examples, but the present invention shall not be restricted to the examples and the like shown below.

Methods for Measuring the Physical Properties of Flake Natural Graphite and Nanoparticles:

Physical properties such as a flatness, an aspect ratio of the flake natural graphite and a sphericity and a specific surface area of the nanoparticles which were used in the examples, the reference examples and the comparative examples were measured by the following measuring methods.

Measuring Method for Flatness:

Measured (n=10) is the maximum distance between two parallel lines which are brought into contact with a particle shown in FIG. 1 observed under SEM whose ab face is perpendicular to an observer and which lines were parallel to line segments connecting long axis end parts of the particles.

The aspect ratio is calculated from a c axis length measured from FIG. 1 and an ab face measured from the observed image in terms of a ratio thereof.

Measuring Method for Sphericity:

Determined is in terms of the maximum value of distances in a radial direction from the minimum circumscribed circle to the surface of a particle with respect to ten particles observed on an SEM or TEM image.

Measuring Method for Specific Surface Area:

A BET specific surface area determined by a BET dynamic method is set to a specific surface area of the nanoparticles and measured by means of a full automatic BET specific surface area measuring apparatus (HM-model-1208) manufactured by Mountech Co., Ltd.

Examples 1 to 6, Reference Example 1 and Comparative Examples 1 to 7

First Embodiment

Example 1

| | |
|---|---|
| Flake natural graphite A (ab face having a flatness of 0.2 µm, mv value: 8 µm, thickness of a c axis: 1 µm, aspect ratio: 8) | 40 parts by mass |
| Polyvinyl chloride | 40 parts by mass |
| Sodium stearate | 1 part by mass |
| Dioctyl phthalate | 19 parts by mass |

The materials described above were mixed and dispersed by means of a Henschel mixer and kneaded by means of a pressure kneader or a roll mill, and after molded, the molded matter was dried to remove dioctyl phthalate and subjected to burning treatment at 1000° C. for 10 hours in nitrogen gas atmosphere, whereby a burned pencil lead body having a diameter of 0.565 mm and a length of 60 mm was produced.

Next, the burned pencil lead body was impregnated (impregnation time: 180 minutes, hereinafter the same shall apply) at a pressure of 1 MPa with liquid A (liquid temperature: 100° C., hereinafter the same shall apply) in which nanoparticles A (0.1% by mass) described below were dispersed, and a nanodiamond-containing burned pencil lead was obtained.

Liquid A: dimethyl silicone oil KF 96-30CS (dynamic viscosity: 30 mm$^2$/s, refractive index: 1.401, manufactured by Shin-Etsu Chemical Co., Ltd.)

Nanoparticles A: diamond nanoparticles (sphericity: 3 nm, my value: 10 nm, manufactured by Sumiseki Materials Co., Ltd.)

Nanoparticles A described above had a mv value of 0.125 based on 100 of a volume average diameter (mv value) of flake natural graphite A.

Example 2

Liquid B: CMC-Na 1 wt % in distilled water (dynamic viscosity: 7 mm$^2$/s, refractive index: 1.345)

Nanoparticles A: diamond nanoparticles (sphericity: 3 nm, my value: 10 nm, manufactured by Sumiseki Materials Co., Ltd.)

The burned pencil lead body obtained in Example 1 described above was impregnated at a pressure of 1 MPa with liquid B in which nanoparticles A (0.1% by mass) described above were dispersed, and a nanodiamond-containing burned pencil lead was obtained.

Example 3

Liquid C: trimethylpentaphenyltrisiloxane (dynamic viscosity: 175 mm$^2$/s, refractive index: 1.580, manufactured by Toray Industries, Inc.)

Nanoparticles A: diamond nanoparticles (sphericity: 3 nm, mv value: 10 nm, manufactured by Sumiseki Materials Co., Ltd.)

The burned pencil lead body obtained in Example 1 described above was impregnated at a pressure of 1 MPa with liquid C in which nanoparticles A (0.1% by mass) described above were dispersed, and a nanodiamond-containing burned pencil lead was obtained.

Example 4

Liquid D: dimethyl silicone KF 96L-5cs (dynamic viscosity: 5 mm$^2$/s, refractive index: 1.396, manufactured by Shin-Etsu Chemical Co., Ltd.)
Nanoparticles A: diamond nanoparticles (sphericity: 3 nm, mv value: 10 nm, manufactured by Sumiseki Materials Co., Ltd.)

The burned pencil lead body obtained in Example 1 described above was impregnated at a pressure of 1 MPa with liquid D in which nanoparticles A (0.1% by mass) described above were dispersed, and a nanodiamond-containing burned pencil lead was obtained.

Example 5

Liquid E: dimethyl silicone KF 96-500cs (dynamic viscosity: 500 mm$^2$/s, refractive index: 1.403, manufactured by Shin-Etsu Chemical Co., Ltd.)
Nanoparticles A: diamond nanoparticles (sphericity: 3 nm, mv value: 10 nm, manufactured by Sumiseki Materials Co., Ltd.)

The burned pencil lead body obtained in Example 1 described above was impregnated at a pressure of 1 MPa with liquid E in which nanoparticles A (0.1% by mass) described above were dispersed, and a nanodiamond-containing burned pencil lead was obtained.

Example 6

| | |
|---|---|
| Flake natural graphite A (ab face having a flatness of 0.2 µm, mv value: 8 µm, thickness of a c axis: 1 µm, aspect ratio: 8) | 70 parts by mass |
| Kaolinite clay | 5 parts by mass |
| Halloysite clay | 15 parts by mass |
| Water | 30 parts by mass |

The materials described above were mixed and dispersed by means of a Henschel mixer, and the mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with liquid F in which nanoparticles A (0.1% by mass) described below were dispersed, and a wood case pencil lead having a diameter of 2.05 mm was obtained.
Liquid F: Miyoshi Controlled Lard (manufactured by Miyoshi Oil & Fat Co., Ltd.)
Nanoparticles A: diamond nanoparticles (sphericity: 3 nm, mv value: 10 nm, manufactured by Sumiseki Materials Co., Ltd.)

The nanoparticles described above had a mv value of 0.125 based on 100 of a volume average diameter (mv value) of flake natural graphite A.

Reference Example

The Nanoparticles were Mixed and Dispersed in the Materials

| | |
|---|---|
| Flake natural graphite A (ab face having a flatness of 0.2 µm, mv value: 8 µm, thickness of a c axis: 1 µm, aspect ratio: 8) | 40 parts by mass |
| Diamond nanoparticles (sphericity: 3 nm, mv value: 10 nm, manufactured by Sumiseki Materials Co., Ltd.) | 0.1 part by mass |
| Polyvinyl chloride | 40 parts by mass |
| Sodium stearate | 1 part by mass |
| Dioctyl phthalate | 19 parts by mass |

The materials described above were mixed and dispersed by means of a Henschel mixer and kneaded by means of a pressure kneader or a roll mill, and after molded, the molded matter was dried to remove dioctyl phthalate and then subjected to burning treatment at 1000° C. for 10 hours in nitrogen gas atmosphere, whereby a burned pencil lead body having a diameter of 0.565 mm and a length of 60 mm was produced.

Next, the burned pencil lead body described above was impregnated at a pressure of 1 MPa with liquid A used in Example 1 described above, and a nanodiamond-containing burned pencil lead was obtained.

Comparative Example 1

Based on Example 11 of Japanese Patent Application Laid-Open No. 138031/2007

| | |
|---|---|
| Flake natural graphite (flatness of 3 µm, mv value: 10 µm, thickness of a c axis: 1 µm, aspect ratio: 10) | 49 parts by mass |
| Diamond nanoparticles (single crystal diamond, sphericity: 1.5 nm, mv value: 5 nm) | 1 part by mass |
| Polyvinyl chloride | 50 parts by mass |
| Sodium stearate | 1 part by mass |
| Dioctyl phthalate | 20 parts by mass |

The materials described above were mixed and dispersed by means of a Henschel mixer and kneaded by means of a pressure kneader or a double roll mill, and the kneaded matter was extrusion-molded in the form of a linear body. Then, the molded matter was subjected to heat treatment in the air in order to remove the residual plasticizer and solidified (dried), and it was then burned at 1000° C. in nitrogen gas atmosphere. Finally, the burned pencil lead was dipped in α-olefin oligomer (Lipolupe 20, manufactured by Lion Corporation) to obtain a lead HB for a mechanical pencil having a diameter of 0.570 mm.

Comparative Example 2

Liquid A: dimethyl silicone oil KF 96-30CS (dynamic viscosity: 30 mm$^2$/s, refractive index: 1.401, manufactured by Shin-Etsu Chemical Co., Ltd.)

Nanoparticles B: diamond nanoparticles (sphericity: 25 nm, mv value: 50 nm, manufactured by Sumiseki Materials Co., Ltd.)

The burned pencil lead body obtained in Example 1 described above was impregnated (impregnation time: 180 minutes) at a pressure of 1 MPa with liquid A (liquid temperature: 100° C.) in which nanoparticles B (0.1% by mass) described above were dispersed, and a nanodiamond-containing burned pencil lead was obtained.

Comparative Example 3

A nanodiamond-containing burned pencil lead was obtained in the same manner as in Example 1, except that the flake natural graphite A (ab face having a flatness of 0.2 μm, my value: 8 μm, thickness of a c axis: 1 μm, aspect ratio: 8) used in Example 1 described above was changed to the same amount of flake natural graphite B (ab face having a flatness of 3 μm, mv value: 10 μm, thickness of a c axis: 1 μm, aspect ratio: 10).

Comparative Example 4

A nanodiamond-containing burned pencil lead was obtained in the same manner as in Example 1, except that the flake natural graphite A (ab face having a flatness of 0.2 μm, my value: 8 μm, thickness of a c axis: 1 μm, aspect ratio: 8) used in Example 1 described above was changed to the same amount of flake natural graphite C (ab face having a flatness of 0.2 μm, mv value: 3 μm, thickness of a c axis: 1 μm, aspect ratio: 3).

Comparative Example 5

The pencil lead body obtained in Example 1 described above was impregnated under pressure, as was the case with Example 1, with liquid A used in Example 1 containing no nanoparticles A, and a nanodiamond-containing burned pencil lead was obtained.

Comparative Example 6

Based on Example 11 of Japanese Patent Application Laid-Open No. 2007-138031

| | |
|---|---|
| Flake natural graphite (flatness of 3 μm, mv value: 10 μm, thickness of a c axis: 1 μm, aspect ratio: 10) | 69 parts by mass |
| Diamond nanoparticles (single crystal diamond, sphericity: 1.5 nm, mv value: 5 nm) | 1 part by mass |
| Kaolinite clay | 15 parts by mass |
| Halloysite clay | 15 parts by mass |
| Water | 30 parts by mass |

The materials described above were mixed and dispersed by means of a Henschel mixer, and the mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with liquid F (Miyoshi Controlled Lard) used in Example 6, and a wood case pencil lead having a diameter of 2.05 mm was obtained.

Comparative Example 7

The pencil lead body obtained in Example 6 described above was impregnated, as was the case with Example 6, with liquid F (Miyoshi Controlled Lard) used in Example 6 containing no nanoparticles A, and a wood case pencil lead having a diameter of 2.05 mm was obtained.

The respective burned pencil leads (pencil leads for a mechanical pencil and wood case pencil leads) obtained in Examples 1 to 6, Reference Example 1 and Comparative Examples 1 to 7 were used to evaluate bending strength, compression strength (N), an abrasion amount (mm), intensity, an erasing rate (%), a frictional coefficient (static and dynamic), a nanoparticle number, writing feeling by sensory evaluation, difficulty of stain and initial sliding by the following respective evaluation methods. The results thereof are shown in the following Table 1.

Measuring Method for Bending Strength:

The pencil leads for a mechanical pencil obtained in Examples 1 to 5, Reference Example and Comparative Examples 1 to 6 were used to measure bending strength thereof by a bending strength test prescribed in JIS S 6005: 2007 (n=10). Further, the wood case pencil leads obtained in Example 6 and Comparative Examples 6 and 7 were used to measure bending strength thereof by a bending strength test prescribed in JIS S 6006:2007 (n=10).

Measuring Method for Compression Strength:

The lead was put horizontally on a flat plane and fixed thereon, and it was subjected to a compression test from upward by means of Tensilon (ORIENTEC RTC-1150A) which was a compression tool having a lateral width of 2 mm and a longitudinal width of 5 mm to measure breaking strength (n=10).

The compression strength which is an evaluation item is an index showing difficulty of breaking by a chuck of a pencil lead for a mechanical pencil, and therefore it was not measured in the wood case pencil leads obtained in Example 6 and Comparative Examples 6 and 7 and shown by [-] in the evaluation.

Test Method for Abrasion Test:

An abrasion length of the lead in writing at a writing angle of 75°, a load of 300 gf and a writing distance of 5 m was measured (n=10).

Measuring Method for Intensity:

The density is a value obtained by measuring the lines written in the abrasion test by means of a densitometer (sakura DENSITOMETER PDA65) (n=10×4 positions).

Measuring Method for Erasing Rate:

An eraser (EP-105E) was reciprocated five times on the lines written in the abrasion test, and then an erasing rate of the lines was determined (n=10).

Measuring Method for Frictional Coefficient:

A value (n=10) obtained by dividing an average value of total frictional forces in the lines drawn by a drawing method using the drawing apparatus prescribed in JIS S 6005:2007 and JIS S 6006:2007 by a writing load was set to "a dynamic frictional coefficient", and a value obtained by dividing a maximum value of friction by a writing load was set to "a static frictional coefficient".

Measuring Method for Nanoparticle Number:

The number of the nanoparticles was measured by observing a polished cross section of the respective pencil leads obtained in an area of 5 μm×5 μm by means of FE-SEM (S-4700 model, accelerating voltage: 5 kV, current value: 10 μA, manufactured by Hitachi High-Technologies Corporation).

Evaluation Methods for Writing Feeling, Difficulty of Stain and Initial Sliding:

Ten testers wrote "Mitsubishi pencil" repeatedly on one copy paper for writing 400 characters to relatively evaluate the following respective items by comparing with an existing product ("SHU" 0.5 mm-HB, manufactured by Mitsubishi Pencil Co., Ltd.) of the company concerned.

The writing feeling was compared with whether or not felt smooth and evaluated according to the following evaluation criteria.

Stain of the finger after writing 400 characters was compared to evaluate the difficulty of stain according to the following evaluation criteria.

Whether or not each line was started sliding smoothly was compared to evaluate the initial sliding according to the following evaluation criteria.

Evaluation Criteria (Average Value):
◎: very good
○: better than the existing product
Δ: equal to the existing product
x: worse than the existing product Comments on Examples, Reference Example and Comparative Examples in the First Embodiment As apparent from the results shown in Table 1, it has been found that the respective pencil leads for a mechanical pencil obtained in Examples 1 to 5 and the wood case pencil lead obtained in Example 6 each falling in the scope of the present invention are excellent in bending strength and compression strength and have a satisfactory color forming property and satisfactory drawn line intensity and that they have less abrasion, a good erasing property, good initial sliding and good writing feeling (pen touch) and result in being difficult of stain as compared with the respective pencil leads for a mechanical pencil obtained in Comparative Examples 1 to 5 and Reference Example 1 and the wood case pencil leads obtained in Comparative Examples 6 and 7 each falling outside the scope of the present invention.

In contrast with this, to observe individually the comparative examples, Comparative Example 1 is a case where the nanoparticles based on Example 11 of Japanese Patent Application Laid-Open No. 2007-138031 falling outside the scope of the present invention were used; Comparative Examples 3 and 4 are cases where the flake graphites falling outside the scope of the present invention were used; Comparative Example 5 is a case where the nanoparticles were not used;

TABLE 1

| | Lead diameter mm | Breaking load N | Bending strength MPa | Compression strength N | Abrasion mm | Intensity | Erasing rate % | Frictional coefficient Static | Frictional coefficient Dynamic | Nano-particle number | Sensory evaluation Writing feeling | Sensory evaluation Difficulty of stain | Sensory evaluation Initial sliding |
|---|---|---|---|---|---|---|---|---|---|---|---|---|---|
| Example 1 | 0.565 | 0.756 | 426.9 | 26.16 | 2.246 | 0.419 | 98.13 | 0.515 | 0.183 | 40 | ◎ | ◎ | ◎ |
| Example 2 | 0.565 | 0.756 | 426.9 | 26.13 | 1.732 | 0.311 | 95.22 | 0.620 | 0.186 | 42 | ◎ | ◎ | ○ |
| Example 3 | 0.565 | 0.754 | 425.8 | 26.17 | 2.100 | 0.369 | 98.11 | 0.555 | 0.190 | 35 | ◎ | ○ | ○ |
| Example 4 | 0.565 | 0.756 | 426.9 | 26.15 | 2.341 | 0.415 | 97.05 | 0.617 | 0.184 | 43 | ◎ | ◎ | ○ |
| Example 5 | 0.565 | 0.756 | 426.9 | 26.14 | 1.811 | 0.413 | 94.67 | 0.526 | 0.200 | 33 | ○ | ○ | ◎ |
| Example 6 | 2.050 | 6.850 | 121.5 | — | 1.523 | 0.409 | 97.63 | 0.736 | 0.211 | 29 | ◎ | ◎ | ○ |
| Reference Example 1 | 0.565 | 0.735 | 415.1 | 25.12 | 2.011 | 0.448 | 95.68 | 0.681 | 0.191 | 1000 or more | ◎ | ◎ | ○ |
| Comparative Example 1 | 0.570 | 0.751 | 413.1 | 26.01 | 1.782 | 0.432 | 95.51 | 0.750 | 0.200 | 1000 or more | ◎ | ◎ | Δ |
| Comparative Example 2 | 0.570 | 0.755 | 415.3 | 26.03 | 1.606 | 0.367 | 95.43 | 0.790 | 0.201 | 1 | ○ | ◎ | X |
| Comparative Example 3 | 0.570 | 0.743 | 408.7 | 25.83 | 2.244 | 0.412 | 92.38 | 0.737 | 0.227 | 40 | ○ | Δ | Δ |
| Comparative Example 4 | 0.570 | 0.726 | 399.3 | 26.24 | 3.041 | 0.413 | 89.25 | 0.802 | 0.216 | 45 | ○ | X | X |
| Comparative Example 5 | 0.570 | 0.753 | 414.2 | 26.17 | 2.033 | 0.400 | 97.17 | 0.773 | 0.224 | 0 | Δ | Δ | Δ |
| Comparative Example 6 | 2.050 | 6.220 | 110.3 | — | 1.623 | 0.433 | 95.44 | 0.696 | 0.209 | 1000 or more | ○ | ○ | ◎ |
| Comparative Example 7 | 2.050 | 6.630 | 117.6 | — | 1.508 | 0.399 | 96.85 | 0.770 | 0.229 | 0 | Δ | Δ | Δ | and it has been found that the targeted pencil leads are not obtained from the above respective pencil leads for a mechanical pencil. Further, Comparative Example 6 provides the wood case pencil lead based on Example 11 of Japanese Patent Application Laid-Open No. 2007-138031; Comparative Example 7 provides the wood case pencil lead in which the nanoparticles were not used; and it has been found that the targeted pencil leads are not obtained from the above wood case pencil leads.

Examples 7 to 12, Reference Example 2 and Comparative Examples 8 to 15

Second Embodiment

Example 7

| | |
|---|---|
| Flake natural graphite A (ab face having a flatness of 0.2 μm, mv value: 8 μm, thickness of a c axis: 1 μm, aspect ratio: 8) | 40 parts by mass |
| Polyvinyl chloride | 40 parts by mass |
| Sodium stearate | 1 part by mass |
| Dioctyl phthalate | 19 parts by mass |

The materials described above were mixed and dispersed by means of a Henschel mixer and kneaded by means of a pressure kneader and a roll mill, and after molded, the molded matter was dried to remove dioctyl phthalate and subjected to burning treatment at 1000° C. for 10 hours in nitrogen gas atmosphere, whereby a burned pencil lead body having a diameter of 0.565 mm and a length of 60 mm was produced.

Next, the burned pencil lead body was impregnated (impregnation time: 180 minutes, hereinafter the same shall apply) at a pressure of 1 MPa with liquid A (liquid temperature: 100° C., hereinafter the same shall apply) in which nanoparticles A (0.1% by mass) described below were dispersed, and a nanodiamond-containing burned pencil lead was obtained.

Liquid A: dimethyl silicone oil KF 96-30CS (dynamic viscosity: 30 $mm^2$/s, refractive index: 1.401, manufactured by Shin-Etsu Chemical Co., Ltd.)
Nanoparticles C: diamond nanoparticles (specific surface area: 450 $m^2$/g, my value: 10 nm, manufactured by Sumiseki Materials Co., Ltd.)

The nanoparticles C had a mv value of 0.125 based on 100 of a volume average diameter (mv value) of flake natural graphite A.

Example 8

Liquid B: CMC-Na 1 wt % in distilled water (dynamic viscosity: 7 $mm^2$/s, refractive index: 1.345)
Nanoparticles C: diamond nanoparticles (specific surface area of 450 $m^2$/g, my value: 10 nm, manufactured by Sumiseki Materials Co., Ltd.)

The burned pencil lead body obtained in Example 7 described above was impregnated at a pressure of 1 MPa with liquid B in which nanoparticles C (0.1% by mass) described above were dispersed, and a nanodiamond-containing burned pencil lead was obtained.

Example 9

Liquid C: trimethylpentaphenyltrisiloxane (dynamic viscosity: 175 $mm^2$/s, refractive index: 1.580, manufactured by Toray Industries, Inc.)
Nanoparticles C: diamond nanoparticles (specific surface area of 450 $m^2$/g, my value: 10 nm, manufactured by Sumiseki Materials Co., Ltd.)

The burned pencil lead body obtained in Example 7 described above was impregnated at a pressure of 1 MPa with liquid C in which nanoparticles C (0.1% by mass) described above were dispersed, and a nanodiamond-containing burned pencil lead was obtained.

Example 10

Liquid D: dimethyl silicone KF 96L-5cs (dynamic viscosity: 5 $mm^2$/s, refractive index: 1.396, manufactured by Shin-Etsu Chemical Co., Ltd.)
Nanoparticles C: diamond nanoparticles (specific surface area of 450 $m^2$/g, my value: 10 nm, manufactured by Sumiseki Materials Co., Ltd.)

The burned pencil lead body obtained in Example 7 described above was impregnated at a pressure of 1 MPa with liquid D in which nanoparticles C (0.1% by mass) described above were dispersed, and a nanodiamond-containing burned pencil lead was obtained.

Example 11

Liquid E: dimethyl silicone KF 96-500cs (dynamic viscosity: 500 $mm^2$/s, refractive index: 1.403, manufactured by Shin-Etsu Chemical Co., Ltd.)
Nanoparticles C: diamond nanoparticles (specific surface area: 450 $m^2$/g, my value: 10 nm, manufactured by Sumiseki Materials Co., Ltd.)

The burned pencil lead body obtained in Example 7 described above was impregnated at a pressure of 1 MPa with liquid E in which nanoparticles C (0.1% by mass) described above were dispersed, and a nanodiamond-containing burned pencil lead was obtained.

Example 12

| | |
|---|---|
| Flake natural graphite A (ab face having a flatness of 0.2 μm, mv value: 8 μm, thickness of a c axis: 1 μm, aspect ratio: 8) | 70 parts by mass |
| Kaolinite clay | 15 parts by mass |
| Halloysite clay | 15 parts by mass |
| Water | 30 parts by mass |

The materials described above were mixed and dispersed by means of a Henschel mixer, and the mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with liquid F in which nanoparticles C (0.1% by mass) described below were dispersed, and a wood case pencil lead having a diameter of 2.05 mm was obtained.
Liquid F: Miyoshi Controlled Lard (manufactured by Miyoshi Oil & Fat Co., Ltd.)
Nanoparticles C: diamond nanoparticles (specific surface area: 450 $m^2$/g, my value: 10 nm, manufactured by Sumiseki Materials Co., Ltd.)

The nanoparticles described above had a mv value of 0.125 based on 100 of a volume average diameter (mv value) of flake natural graphite A.

Reference Example 2

Nanoparticles C were Mixed and Dispersed in the Materials

| | |
|---|---|
| Flake natural graphite A (ab face having a flatness of 0.2 μm, mv value: 8 μm, thickness of a c axis: 1 μm, aspect ratio: 8) | 40 parts by mass |
| Diamond nanoparticles (specific surface area: 450 m²/g, mv value: 10 nm, manufactured by Sumiseki Materials Co., Ltd.) | 0.1 part by mass |
| Polyvinyl chloride | 40 parts by mass |
| Sodium stearate | 1 part by mass |
| Dioctyl phthalate | 19 parts by mass |

The materials described above were mixed and dispersed by means of a Henschel mixer and kneaded by means of a pressure kneader and a roll mill, and after molded, the molded matter was dried to remove dioctyl phthalate and then subjected to burning treatment at 1000° C. for 10 hours in nitrogen gas atmosphere, whereby a burned pencil lead body having a diameter of 0.565 mm and a length of 60 mm was produced.

Next, the burned pencil lead body described above was impregnated at a pressure of 1 MPa with liquid A used in Example 7 described above, and a nanodiamond-containing burned pencil lead was obtained.

Comparative Example 8

Based on Example 11 of Japanese Patent Application Laid-Open No. 2007-138031

| | |
|---|---|
| Flake natural graphite (flatness of 3 μm, mv value: 10 μm, thickness of a c axis: 1 μm, an aspect ratio of 10) | 49 parts by mass |
| Diamond nanoparticles (cluster diamond, specific surface area: 820 m²/g, mv value: 5 nm) | 1 part by mass |
| Polyvinyl chloride | 50 parts by mass |
| Sodium stearate | 1 part by mass |
| Dioctyl phthalate | 20 parts by mass |

The materials described above were mixed and dispersed by means of a Henschel mixer and kneaded by means of a pressure kneader and a double roll mill, and the kneaded matter was extrusion-molded in the form of a linear body. Then, the molded matter was subjected to heat treatment in the air in order to remove the residual plasticizer and solidified (dried), and it was then burned at 1000° C. in nitrogen gas atmosphere. Finally, the burned pencil lead body was dipped in an α-olefin oligomer (Lipolupe 20, manufactured by Lion Corporation) to obtain a lead HB for a mechanical pencil having a diameter of 0.570 mm.

Comparative Example 9

Liquid A: dimethyl silicone oil KF 96-30CS (dynamic viscosity: 30 mm²/s, refractive index: 1.401, manufactured by Shin-Etsu Chemical Co., Ltd.)

Nanoparticles D: diamond nanoparticles (single crystal diamond, specific surface area of 18.54 m²/g, mv value: 100 nm, manufactured by Sumiseki Materials Co., Ltd.)

The burned pencil lead body obtained in Example 7 described above was impregnated (impregnation time: 180 minutes) at a pressure of 1 MPa with liquid A (liquid temperature: 100° C.) in which nanoparticles D (0.1% by mass) described above were dispersed, and a nanodiamond-containing burned pencil lead was obtained.

Comparative Example 10

Liquid A: dimethyl silicone oil KF 96-30CS (dynamic viscosity: 30 mm²/s, refractive index: 1.401, manufactured by Shin-Etsu Chemical Co., Ltd.)

Nanoparticles E: diamond nanoparticles (cluster diamond, specific surface area: 848 m²/g, mv value: 20 nm, manufactured by Sumiseki Materials Co., Ltd.)

The burned pencil lead body obtained in Example 7 described above was impregnated at a pressure of 1 MPa with liquid A (liquid temperature: 100° C.) in which nanoparticles E (0.1% by mass) described above were dispersed, and a nanodiamond-containing burned pencil lead was obtained.

Comparative Example 11

A nanodiamond-containing burned pencil lead was obtained in the same manner as in Example 7, except that flake natural graphite A (ab face having a flatness of 0.2 μm, mv value: 8 μm, thickness of a c axis: 1 μm, aspect ratio: 8) used in Example 7 described above was changed to the same amount of flake natural graphite B (ab face having a flatness of 3 μm, mv value: 10 μm, thickness of a c axis: 1 μm, aspect ratio: 10).

Comparative Example 12

A nanodiamond-containing burned pencil lead was obtained in the same manner as in Example 7, except that flake natural graphite A (ab face having a flatness of 0.2 μm, mv value: 8 μm, thickness of a c axis: 1 μm, aspect ratio: 8) used in Example 7 described above was changed to the same amount of flake natural graphite C (ab face having a flatness of 0.2 μm, mv value: 3 μm, thickness of a c axis: 1 μm, aspect ratio: 3).

Comparative Example 13

The pencil lead body obtained in Example 7 described above was impregnated under pressure, as was the case with Example 7, with liquid A used in Example 7 containing no nanoparticles C and a nanodiamond-containing burned pencil lead was obtained.

Comparative Example 14

Based on Example 11 of Japanese Patent Application Laid-Open No. 2007-138031

| | |
|---|---|
| Flake natural graphite A (ab face having a flatness of 0.2 μm, mv value: 8 μm, thickness of a c axis: 1 μm, aspect ratio: 8) | 69 parts by mass |

-continued

| | |
|---|---|
| Diamond nanoparticles (cluster diamond, specific surface area of 820 m²/g, mv value: 5 nm) | 1 part by mass |
| Kaolinite clay | 15 parts by mass |
| Halloysite clay | 15 parts by mass |
| Water | 30 parts by mass |

The materials described above were mixed and dispersed by means of a Henschel mixer, and the mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with liquid F (Miyoshi Controlled Lard) used in Example 12, and a wood case pencil lead having a diameter of 2.05 mm was obtained.

Comparative Example 15

The pencil lead body obtained in Example 12 described above was impregnated, as was the case with Example 12, with liquid F (Miyoshi Controlled Lard) used in Example 12 containing no nanoparticles C, and a wood case pencil lead having a diameter of 2.05 mm was obtained.

The respective burned pencil leads (pencil leads for a mechanical pencil and wood case pencil leads) obtained in Examples 7 to 12, Reference Example 2 and Comparative Examples 8 to 15 were used to evaluate bending strength, compression strength (N), an abrasion amount (mm), intensity, an erasing rate (%), a frictional coefficient (static and dynamic), a nanoparticle number, writing feeling by sensory evaluation, difficulty of stain and initial sliding by the respective evaluation methods described above. The results thereof are shown in the following Table 2.

TABLE 2

| | Lead diameter mm | Breaking load N | Bending strength MPa | Compression strength N | Abrasion mm | Intensity | Erasing rate % | Sensory coefficient Static | Dynamic | Nano-particle number | Sensory evaluation Writing feeling | Difficulty of stain | Initial sliding |
|---|---|---|---|---|---|---|---|---|---|---|---|---|---|
| Example 7 | 0.565 | 0.756 | 426.9 | 26.15 | 2.246 | 0.419 | 98.06 | 0.504 | 0.179 | 40 | ◎ | ◎ | ◎ |
| Example 8 | 0.565 | 0.754 | 425.8 | 26.15 | 1.740 | 0.323 | 95.38 | 0.612 | 0.199 | 42 | ◎ | ◎ | ○ |
| Example 9 | 0.565 | 0.754 | 425.8 | 26.15 | 2.161 | 0.366 | 98.24 | 0.560 | 0.188 | 35 | ◎ | ○ | ◎ |
| Example 10 | 0.565 | 0.754 | 425.8 | 26.15 | 2.322 | 0.416 | 97.09 | 0.605 | 0.181 | 43 | ◎ | ◎ | ○ |
| Example 11 | 0.565 | 0.754 | 425.8 | 26.15 | 1.824 | 0.400 | 94.48 | 0.530 | 0.198 | 33 | ○ | ○ | ◎ |
| Example 12 | 2.050 | 6.840 | 121.3 | — | 1.535 | 0.417 | 97.28 | 0.729 | 0.201 | 26 | ◎ | ◎ | ○ |
| Reference Example 2 | 0.565 | 0.735 | 415.1 | 25.12 | 2.011 | 0.448 | 95.68 | 0.681 | 0.191 | 1000 or more | ◎ | ◎ | ○ |
| Comparative Example 8 | 0.570 | 0.751 | 413.1 | 26.01 | 1.782 | 0.432 | 95.51 | 0.750 | 0.200 | 1000 or more | ◎ | ◎ | Δ |
| Comparative Example 9 | 0.570 | 0.690 | 379.5 | 26.51 | 2.545 | 0.397 | 94.07 | 0.760 | 0.223 | 1 | ○ | ◎ | Δ |
| Comparative Example 10 | 0.570 | 0.652 | 358.6 | 22.15 | 1.350 | 0.298 | 88.80 | 0.781 | 0.231 | 10 | Δ | Δ | Δ |
| Comparative Example 11 | 0.570 | 0.746 | 410.3 | 25.85 | 2.253 | 0.402 | 92.13 | 0.789 | 0.225 | 40 | ○ | Δ | Δ |
| Comparative Example 12 | 0.570 | 0.728 | 400.4 | 26.23 | 3.049 | 0.405 | 89.21 | 0.822 | 0.211 | 45 | ○ | X | X |
| Comparative Example 13 | 0.570 | 0.755 | 415.3 | 26.15 | 1.999 | 0.401 | 97.16 | 0.776 | 0.221 | 0 | Δ | Δ | Δ |
| Comparative Example 14 | 2.050 | 6.280 | 111.4 | — | 1.644 | 0.443 | 94.40 | 0.696 | 0.203 | 1000 or more | ○ | ○ | ◎ |
| Comparative Example 15 | 2.050 | 6.630 | 117.6 | — | 1.508 | 0.399 | 96.85 | 0.770 | 0.229 | 0 | Δ | Δ | Δ |

Comments on Examples, Reference Example and Comparative Examples in the Second Embodiment As apparent from the results shown in Table 2, it has been found that the respective pencil leads for a mechanical pencil obtained in Examples 7 to 11 and the wood case pencil lead obtained in Example 12 each falling in the scope of the present invention are excellent in bending strength and compression strength and have a satisfactory color forming property and satisfactory drawn line intensity and that they have less abrasion, a good erasing property, good initial sliding and good writing feeling (pen touch) and result in being difficult of stain as compared with the respective pencil leads for a mechanical pencil obtained in Comparative Examples 8 to 13 and Reference Example 2 and the wood case pencil leads obtained in Comparative Examples 14 and 15 each falling outside the scope of the present invention.

In contrast with this, to observe individually the comparative examples, Comparative Example 8 is based on Example 11 of Japanese Patent Application Laid-Open No. 138031/2007; Comparative Examples 9 and 10 are cases where the nanoparticles falling outside the scope of the present invention were used; Comparative Examples 11 and 12 are cases where the flake graphites falling outside the scope of the present invention were used; Comparative Example 13 is a case where the nanoparticles were not used; and it has been found that the targeted pencil leads are not obtained from the above respective pencil leads for a mechanical pencil. Further, Comparative Example 14 provides the wood case pencil lead based on Example 11 of Japanese Patent Application Laid-Open No. 138031/2007; Comparative Example 15 provides the wood case pencil lead in which the nanoparticles were not used; and it has been found that the targeted pencil leads are not obtained from the above wood case pencil leads.

Examples 13 to 18 and Comparative Examples 16 to 22

Third Embodiment

Example 13

| | |
|---|---|
| Flake natural graphite A (ab face having a flatness of 0.2 µm, mv value: 8 µm, thickness of a c axis: 1 µm, aspect ratio: 8) | 40 parts by mass |
| Nanoparticles F: diamond nanoparticles (sphericity: 10 nm, mv value: 50 nm, manufactured by Sumiseki Materials Co., Ltd.) | 0.4 part by mass |
| Polyvinyl chloride | 40 parts by mass |
| Sodium stearate | 1 part by mass |
| Dioctyl phthalate | 19 parts by mass |

The flake graphite and nanoparticles F each described above were put into a Henschel mixer rotated at a high speed (2000 rpm, hereinafter the same shall apply) to produce the flake graphite to which the diamond nanoparticles were adhered (time for adhesion: 20 minutes, hereinafter the same shall apply). Then, the remaining materials were put into the Henschel mixer, mixed and dispersed, and the mixture was kneaded by means of a pressure kneader and a roll mill. After molded, the molded matter was then dried to remove dioctyl phthalate and subjected to burning treatment at 1000° C. for 10 hours in nitrogen gas atmosphere, whereby a burned pencil lead body having a diameter of 0.565 mm and a length of 60 mm was produced.

Next, the burned pencil lead body described above was impregnated (impregnation time: 180 minutes, hereinafter the same shall apply) at a pressure of 1 MPa with liquid A (liquid temperature: 100° C., hereinafter the same shall apply) described below, and a nanodiamond-containing burned pencil lead was obtained.
Liquid A: dimethyl silicone oil KF 96-30CS (dynamic viscosity: 30 mm$^2$/s, refractive index: 1.401, manufactured by Shin-Etsu Chemical Co., Ltd.)

Nanoparticles F described above had a mv value of 0.125 based on 100 of a volume average diameter (mv value) of flake natural graphite A.

Example 14

Liquid B: CMC-Na 1 wt % in distilled water (dynamic viscosity: 7 mm$^2$/s, refractive index: 1.345)
The burned pencil lead body obtained in Example 13 was impregnated at a pressure of 1 MPa with liquid B described above to obtain a nanodiamond-containing burned pencil lead.

Example 15

Liquid C: trimethylpentaphenyltrisiloxane (dynamic viscosity: 175 mm$^2$/s, refractive index: 1.580, manufactured by Toray Industries, Inc.)
The burned pencil lead body obtained in Example 13 was impregnated at a pressure of 1 MPa with liquid C described above to obtain a nanodiamond-containing burned pencil lead.

Example 16

Liquid D: dimethyl silicone KF 96L-5cs (dynamic viscosity: 5 mm$^2$/s, refractive index: 1.396, manufactured by Shin-Etsu Chemical Co., Ltd.)
The burned pencil lead body obtained in Example 13 was impregnated at a pressure of 1 MPa with liquid D described above to obtain a nanodiamond-containing burned pencil lead.

Example 17

Liquid E: dimethyl silicone KF 96-500cs (dynamic viscosity: 500 mm$^2$/s, refractive index: 1.403, manufactured by Shin-Etsu Chemical Co., Ltd.)
The burned pencil lead body obtained in Example 13 was impregnated at a pressure of 1 MPa with liquid E described above to obtain a nanodiamond-containing burned pencil lead.

Example 18

| | |
|---|---|
| Flake natural graphite A (ab face having a flatness of 0.2 µm, mv value: 8 µm, thickness of a c axis: 1 µm, aspect ratio: 8) | 70 parts by mass |
| Nanoparticles A: diamond nanoparticles (sphericity: 10 nm, mv value: 50 nm, manufactured by Sumiseki Materials Co., Ltd.) | 0.4 part by mass |
| Kaolinite clay | 15 parts by mass |
| Halloysite clay | 15 parts by mass |
| Water | 30 parts by mass |

The materials described above were mixed and dispersed by means of a Henschel mixer, and the mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with a liquid F described below, and a wood case pencil lead having a diameter of 2.05 mm was obtained.

Liquid F: Miyoshi Controlled Lard (manufactured by Miyoshi Oil & Fat Co., Ltd.)

The nanoparticles described above had a mv value of 0.125 based on 100 of a volume average diameter (mv value) of flake natural graphite A.

Comparative Example 16

Based on Example 11 of Japanese Patent Application Laid-Open No. 138031/2007

| | |
|---|---|
| Flake natural graphite (flatness of 3 μm, mv value: 10 μm, thickness of a c axis: 1 μm, aspect ratio: 10) | 49 parts by mass |
| Diamond nanoparticles (single crystal diamond, sphericity: 1.5 nm, mv value: 5 nm) | 1 part by mass |
| Polyvinyl chloride | 50 parts by mass |
| Sodium stearate | 1 part by mass |
| Dioctyl phthalate | 20 parts by mass |

The materials described above were mixed and dispersed by means of a Henschel mixer and kneaded by means of a pressure kneader and a double roll mill, and the kneaded matter was extrusion-molded in the form of a linear body. Then, the molded matter was subjected to heat treatment in the air in order to remove the residual plasticizer and solidified (dried), and it was then burned at 1000° C. in nitrogen gas atmosphere. Finally, the burned pencil lead was dipped in an α-olefin oligomer (Lipolupe 20, manufactured by Lion Corporation) to obtain a lead HB for a mechanical pencil having a diameter of 0.570 mm.

Comparative Example 17

A nanodiamond-containing burned pencil lead was obtained in the same manner as in Example 13, except that nanoparticles F: diamond nanoparticles (sphericity: 10 nm, mv value: 50 nm, manufactured by Sumiseki Materials Co., Ltd.) used in Example 13 described above was changed to the same amount of nanoparticles G: diamond nanoparticles (sphericity: 25 nm, mv value: 50 nm, manufactured by Sumiseki Materials Co., Ltd.).

Comparative Example 18

A nanodiamond-containing burned pencil lead was obtained in the same manner as in Example 13, except that flake natural graphite A (ab face having a flatness of 0.2 μm, mv value: 8 μm, thickness of a c axis: 1 μm, aspect ratio: 8) used in Example 13 described above was changed to the same amount of flake natural graphite B (ab face having a flatness of 3 μm, mv value: 10 μm, thickness of a c axis: 1 μm, aspect ratio: 10).

Comparative Example 19

A nanodiamond-containing burned pencil lead was obtained in the same manner as in Example 13, except that the flake natural graphite A (ab face having a flatness of 0.2 μm, mv value: 8 μm, thickness of a c axis: 1 μm, aspect ratio: 8) used in Example 13 described above was changed to the same amount of flake natural graphite C (ab face having a flatness of 0.2 μm, mv value: 3 μm, thickness of a c axis: 1 μm, aspect ratio: 3).

Comparative Example 20

A pencil lead body obtained in the same composition as in Example 13 described above except containing no nanoparticles F was impregnated under pressure, as was the case with Example 13, with liquid A used in Example 13, and a nano-diamond-non-containing burned pencil lead was obtained.

Comparative Example 21

Based on Example 11 of Japanese Patent Application Laid-Open No 138031/2007

| | |
|---|---|
| Flake natural graphite (an ab face having a flatness of 3 μm, mv value: 10 μm, thickness of a c axis: 1 μm, an aspect ratio: 10) | 69 parts by mass |
| Diamond nanoparticles (single crystal diamond, sphericity: 1.5 nm, mv value: 5 nm) | 1 part by mass |
| Kaolinite clay | 15 parts by mass |
| Halloysite clay | 15 parts by mass |
| Water | 30 parts by mass |

The materials described above were mixed and dispersed by means of a Henschel mixer, and the mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with liquid F (Miyoshi Controlled Lard) used in Example 18, and a wood case pencil lead having a diameter of 2.05 mm was obtained.

Comparative Example 22

The pencil lead body obtained in the same composition as in Example 18 described above except containing no nanoparticles A was impregnated, as was the case with Example 18, with liquid F (Miyoshi Controlled Lard) used in Example 18, and a wood case pencil lead having a diameter of 2.05 mm was obtained.

The respective burned pencil leads (pencil leads for a mechanical pencil and wood case pencil leads) obtained in Examples 13 to 18 and Comparative Examples 16 to 22 were used to evaluate bending strength, compression strength (N), an abrasion amount (mm), intensity, an erasing rate (%), a frictional coefficient (static and dynamic), a nanoparticle number, writing feeling by sensory evaluation, difficulty of stain and initial sliding by the respective evaluation methods described above. The results thereof are shown in the following Table 3.

TABLE 3

| | Lead diameter mm | Breaking load N | Bending strength MPa | Compression strength N | Abrasion mm | Intensity | Erasing rate % | Frictional coefficient Static | Frictional coefficient Dynamic | Nano-particle number | Sensory evaluation Writing feeling | Sensory evaluation Difficulty of stain | Sensory evaluation Initial sliding |
|---|---|---|---|---|---|---|---|---|---|---|---|---|---|
| Example 13 | 0.565 | 0.754 | 425.8 | 26.17 | 2.745 | 0.511 | 98.01 | 0.505 | 0.183 | 17 | ◎ | ◎ | ◎ |
| Example 14 | 0.565 | 0.757 | 427.5 | 26.16 | 2.119 | 0.394 | 95.34 | 0.604 | 0.204 | 17 | ◎ | ◎ | ○ |
| Example 15 | 0.565 | 0.755 | 426.4 | 26.16 | 2.633 | 0.442 | 98.23 | 0.570 | 0.194 | 17 | ◎ | ○ | ◎ |
| Example 16 | 0.565 | 0.753 | 425.3 | 26.16 | 2.810 | 0.481 | 97.12 | 0.627 | 0.175 | 17 | ◎ | ◎ | ○ |
| Example 17 | 0.565 | 0.752 | 424.7 | 26.16 | 2.211 | 0.489 | 94.64 | 0.529 | 0.188 | 17 | ○ | ○ | ◎ |
| Example 18 | 2.050 | 6.650 | 117.9 | — | 1.545 | 0.413 | 96.97 | 0.699 | 0.200 | 13 | ◎ | ◎ | ◎ |
| Comparative Example 16 | 0.570 | 0.751 | 413.1 | 26.01 | 1.782 | 0.432 | 95.51 | 0.750 | 0.200 | 1000 or more | ◎ | ◎ | Δ |
| Comparative Example 17 | 0.570 | 0.758 | 416.9 | 26.48 | 1.973 | 0.472 | 95.63 | 0.794 | 0.213 | 18 | ○ | ◎ | X |
| Comparative Example 18 | 0.570 | 0.744 | 409.2 | 25.79 | 2.699 | 0.494 | 92.20 | 0.754 | 0.236 | 17 | ○ | Δ | Δ |
| Comparative Example 19 | 0.570 | 0.726 | 399.3 | 26.24 | 3.691 | 0.482 | 89.11 | 0.836 | 0.224 | 17 | ○ | X | X |
| Comparative Example 20 | 0.570 | 0.758 | 416.9 | 26.23 | 2.534 | 0.496 | 97.00 | 0.772 | 0.218 | 0 | Δ | Δ | Δ |
| Comparative Example 21 | 2.050 | 6.350 | 112.6 | — | 1.604 | 0.419 | 95.92 | 0.754 | 0.217 | 1000 or more | ○ | ○ | ◎ |
| Comparative Example 22 | 2.050 | 6.630 | 117.6 | — | 1.508 | 0.399 | 96.85 | 0.770 | 0.229 | 0 | Δ | Δ | Δ |

Comments on Examples and Comparative Examples in the Third Embodiment

As apparent from the results shown in Table 3, it has been found that the respective pencil leads for a mechanical pencil obtained in Examples 13 to 17 and the wood case pencil lead obtained in Example 18 each falling in the scope of the present invention are excellent in bending strength and compression strength and have a satisfactory color forming property and satisfactory drawn line intensity and that they have less abrasion, a good erasing property, good initial sliding and good writing feeling (pen touch) and result in being difficult of stain as compared with the respective pencil leads for a mechanical pencil obtained in Comparative Examples 16 to 20 and the wood case pencil leads obtained in Comparative Examples 21 and 22 each falling outside the scope of the present invention.

In contrast with this, to observe individually the comparative examples, Comparative Example 16 is based on Example 11 of Japanese Patent Application Laid-Open No. 138031/2007; Comparative Example 17 is a case where the nanoparticles falling outside the scope of the present invention were used; Comparative Examples 18 and 19 are cases where the flake graphites falling outside the scope of the present invention were used; Comparative Example 20 is a case where the pencil lead was produced without adhering nanoparticles A in blending the materials in Example 13 described above; and it has been found that the targeted pencil leads of the present invention are not obtained from the above pencil leads. Further, Comparative Example 21 provides the wood case pencil lead based on Example 11 of Japanese Patent Application Laid-Open No. 138031/2007; Comparative Example 22 provides the wood case pencil lead in which the nanoparticles were not used; and it has been found that the targeted pencil leads are not obtained from the above wood case pencil leads.

Examples 19 to 24 and Comparative Examples 23 to 30

Fourth Embodiment

Example 19

| | |
|---|---|
| Flake natural graphite A (ab face having a flatness of 0.2 μm, mv value: 8 μm, thickness of a c axis: 1 μm, aspect ratio: 8) | 40 parts by mass |
| Nanoparticles H: diamond nanoparticles (specific surface area of 208 m²/g, mv value: 50 nm, manufactured by Sumiseki Materials Co., Ltd.) | 0.4 part by mass |
| Polyvinyl chloride | 40 parts by mass |
| Sodium stearate | 1 part by mass |
| Dioctyl phthalate | 19 parts by mass |

The flake graphite and nanoparticles H each described above were put into a Henschel mixer rotated at a high speed (2000 rpm, hereinafter the same shall apply) to produce flake graphite to which the diamond nanoparticles were adhered (time for adhesion: 20 minutes, hereinafter the same shall apply). Then, the remaining materials were put into the Henschel mixer, mixed and dispersed, and the mixture was kneaded by means of a pressure kneader and a roll mill. After molded, the molded matter was dried to remove dioctyl phthalate and subjected to burning treatment at 1000° C. for 10 hours in nitrogen gas atmosphere, whereby a burned pencil lead body having a diameter of 0.565 mm and a length of 60 mm was produced.

Next, the burned pencil lead body described above was impregnated (impregnation time: 180 minutes, hereinafter the same shall apply) at a pressure of 1 MPa with liquid A (liquid temperature: 100° C., hereinafter the same shall apply) described below, and a nanodiamond-containing burned pencil lead was obtained.

Liquid A: dimethyl silicone oil KF 96-30CS (dynamic viscosity: 30 mm²/s, refractive index: 1.401, manufactured by Shin-Etsu Chemical Co., Ltd.)

Nanoparticles H described above had a mv value of 0.125 based on 100 of a volume average diameter (mv value) of flake natural graphite A.

Example 20

Liquid B: CMC-Na 1 wt % in distilled water (dynamic viscosity: 7 mm$^2$/s, refractive index: 1.345)

The burned pencil lead body obtained in Example 19 was impregnated at a pressure of 1 MPa with liquid B described above to obtain a nanodiamond-containing burned pencil lead.

Example 21

Liquid C: trimethylpentaphenyltrisiloxane (dynamic viscosity: 175 mm$^2$/s, refractive index: 1.580, manufactured by Toray Industries, Inc.)

The burned pencil lead body obtained in Example 19 was impregnated at a pressure of 1 MPa with liquid C described above to obtain a nanodiamond-containing burned pencil lead.

Example 22

Liquid D: dimethyl silicone: KF 96L-5cs (dynamic viscosity: 5 mm$^2$/s, refractive index: 1.396, manufactured by Shin-Etsu Chemical Co., Ltd.)

The burned pencil lead body obtained in Example 19 was impregnated at a pressure of 1 MPa with liquid D described above to obtain a nanodiamond-containing burned pencil lead.

Example 23

Liquid E: dimethyl silicone: KF 96-500cs (dynamic viscosity: 500 mm$^2$/s, refractive index: 1.403, manufactured by Shin-Etsu Chemical Co., Ltd.)

The burned pencil lead body obtained in Example 19 was impregnated at a pressure of 1 MPa with liquid E described above to obtain a nanodiamond-containing burned pencil lead.

Example 24

| | |
|---|---|
| Flake natural graphite A (ab face having a flatness of 0.2 μm, mv value: 8 μm, thickness of a c axis: 1 μm, aspect ratio: 8) | 70 parts by mass |
| Nanoparticles H: diamond nanoparticles (specific surface area of 208 m$^2$/g, mv value: 50 nm, manufactured by Sumiseki Materials Co., Ltd.) | 0.4 part by mass |
| Kaolinite clay | 15 parts by mass |
| Halloysite clay | 15 parts by mass |
| Water | 30 parts by mass |

The materials described above were mixed and dispersed by means of a Henschel mixer, and the mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with liquid F described below to obtain a wood case pencil lead having a diameter of 2.05 mm.

Liquid F: Miyoshi Controlled Lard (manufactured by Miyoshi Oil & Fat Co., Ltd.)

The nanoparticles described above had a mv value of 0.125 based on 100 of a volume average diameter (mv value) of flake natural graphite A.

Comparative Example 24

A nanodiamond-containing burned pencil lead was obtained in the same manner as in Example 19, except that nanoparticles H: diamond nanoparticles (specific surface area: 208 m$^2$/g, mv value: 50 nm, manufactured by Sumiseki Materials Co., Ltd.) was changed to the same amount of nanoparticles I: diamond nanoparticles (specific surface area: 18.54 m$^2$/g, mv value: 100 nm, manufactured by Sumiseki Materials Co., Ltd.).

Comparative Example 25

A nanodiamond-containing burned pencil lead was obtained in the same manner as in Example 19, except that nanoparticles H: diamond nanoparticles (specific surface area: 208 m$^2$/g, mv value: 50 nm, manufactured by Sumiseki Materials Co., Ltd.) was changed to the same amount of nanoparticles J: diamond nanoparticles (cluster diamond, specific surface area: 820 m$^2$/g, mv value: 20 nm).

Comparative Example 26

A nanodiamond-containing burned pencil lead was obtained in the same manner as in Example 19, except that flake natural graphite A (ab face having a flatness of 0.2 μm, mv value: 8 μm, thickness of a c axis: 1 μm, aspect ratio: 8) used in Example 19 described above was changed to the same amount of flake natural graphite B (ab face having a flatness of 3 μm, mv value: 10 μm, thickness of a c axis: 1 μm, aspect ratio: 10).

Comparative Example 27

A nanodiamond-containing burned pencil lead was obtained in the same manner as in Example 19, except that flake natural graphite A (ab face having a flatness of 0.2 μm, mv value: 8 μm, thickness of a c axis: 1 μm, aspect ratio: 8) used in Example 19 described above was changed to the same amount of flake natural graphite C (ab face having a flatness of 0.2 μm, mv value: 3 μm, thickness of a c axis: 1 μm, aspect ratio: 3).

Comparative Example 28

The pencil lead body obtained in the same composition as in Example 19 described above except containing no nanoparticles H was impregnated under pressure, as was the case with Example 19, with liquid A used in Example 19, and a nanodiamond-non-containing burned pencil lead was obtained.

Comparative Example 29

Based on Example 11 of Japanese Patent Application Laid-Open No. 138031/2007

| | |
|---|---|
| Flake natural graphite (ab face having a flatness of 3 μm, mv value: 10 μm, thickness of a c axis: 1 μm, an aspect ratio: 10) | 69 parts by mass |

24, with liquid F (Miyoshi Controlled Lard) used in Example 24, and a wood case pencil lead having a diameter of 2.05 mm was obtained.

The respective burned pencil leads (pencil leads for a mechanical pencil and wood case pencil leads) obtained in Examples 19 to 24 and Comparative Examples 23 to 30 were used to evaluate bending strength, compression strength (N), an abrasion amount (mm), intensity, an erasing rate (%), a frictional coefficient (static and dynamic), a nanoparticle number, writing feeling by sensory evaluation, difficulty of stain and initial sliding by the respective evaluation methods described above. The results thereof are shown in the following Table 4.

TABLE 4

| | Lead diameter mm | Breaking load N | Bending strength MPa | Compression strength N | Abrasion mm | Intensity | Erasing rate % | Frictional coefficient Static | Frictional coefficient Dynamic | Nano-particle number | Sensory evaluation Writing feeling | Sensory evaluation Difficulty of stain | Sensory evaluation Initial sliding |
|---|---|---|---|---|---|---|---|---|---|---|---|---|---|
| Example 19 | 0.565 | 0.757 | 427.5 | 26.17 | 2.744 | 0.516 | 98.25 | 0.524 | 0.179 | 17 | ◎ | ◎ | ◎ |
| Example 20 | 0.565 | 0.754 | 425.8 | 26.15 | 2.112 | 0.399 | 95.17 | 0.622 | 0.199 | 17 | ◎ | ◎ | ○ |
| Example 21 | 0.565 | 0.755 | 426.4 | 26.15 | 2.632 | 0.444 | 98.01 | 0.546 | 0.188 | 17 | ◎ | ○ | ◎ |
| Example 22 | 0.565 | 0.755 | 426.4 | 26.15 | 2.863 | 0.495 | 97.09 | 0.597 | 0.181 | 17 | ◎ | ◎ | ○ |
| Example 23 | 0.565 | 0.753 | 425.3 | 26.16 | 2.218 | 0.487 | 94.67 | 0.500 | 0.198 | 17 | ○ | ○ | ◎ |
| Example 24 | 2.050 | 6.600 | 117.1 | — | 1.526 | 0.412 | 97.40 | 0.686 | 0.198 | 11 | ◎ | ◎ | ◎ |
| Comparative Example 23 | 0.570 | 0.751 | 413.1 | 26.01 | 1.782 | 0.432 | 95.51 | 0.750 | 0.200 | 1000 or more | ◎ | ◎ | Δ |
| Comparative Example 24 | 0.570 | 0.694 | 381.7 | 26.48 | 3.089 | 0.481 | 94.11 | 0.746 | 0.223 | 17 | ○ | ◎ | Δ |
| Comparative Example 25 | 0.570 | 0.658 | 361.9 | 22.35 | 1.642 | 0.371 | 88.68 | 0.778 | 0.231 | 102 | Δ | Δ | Δ |
| Comparative Example 26 | 0.570 | 0.746 | 410.3 | 25.78 | 2.711 | 0.448 | 92.36 | 0.777 | 0.225 | 17 | ○ | Δ | Δ |
| Comparative Example 27 | 0.570 | 0.721 | 396.6 | 26.24 | 3.720 | 0.498 | 89.26 | 0.803 | 0.211 | 17 | ○ | X | X |
| Comparative Example 28 | 0.570 | 0.750 | 412.5 | 26.15 | 2.447 | 0.485 | 97.43 | 0.759 | 0.221 | 0 | Δ | Δ | Δ |
| Comparative Example 29 | 2.050 | 5.990 | 106.2 | — | 1.600 | 0.411 | 94.69 | 0.706 | 0.219 | 1000 or more | ○ | ○ | ◎ |
| Comparative Example 30 | 2.050 | 6.630 | 117.6 | — | 1.508 | 0.399 | 96.85 | 0.770 | 0.229 | 0 | Δ | Δ | Δ |

-continued

| | |
|---|---|
| Diamond nanoparticles (cluster diamond, specific surface area: 820 m²/g, mv value: 5 nm) | 1 part by mass |
| Kaolinite clay | 15 parts by mass |
| Halloysite clay | 15 parts by mass |
| Water | 30 parts by mass |

The materials described above were mixed and dispersed by means of a Henschel mixer, and the mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with liquid F (Miyoshi Controlled Lard) used in Example 6 to obtain a wood case pencil lead having a diameter of 2.05 mm.

Comparative Example 30

The pencil lead body obtained in the same composition as in Example 24 described above except containing no nanoparticles H was impregnated, as was the case with Example Comments on Examples and Comparative Examples in the Fourth Embodiment As apparent from the results shown in Table 4, it has been found that the respective pencil leads for a mechanical pencil obtained in Examples 19 to 23 and the wood case pencil lead obtained in Example 24 each falling in the scope of the present invention are excellent in bending strength and compression strength and have a satisfactory color forming property and satisfactory drawn line intensity and that they have less abrasion, a good erasing property, good initial sliding and good writing feeling (pen touch) and result in being difficult of stain as compared with the respective pencil leads for a mechanical pencil obtained in Comparative Examples 23 to 28 and the wood case pencil leads obtained in Comparative Examples 29 and 30 each falling outside the scope of the present invention.

In contrast with this, to observe individually the comparative examples, Comparative Example 23 is based on Example 11 of Japanese Patent Application Laid-Open No. 138031/2007; Comparative Examples 24 and 25 are cases where the nanoparticles falling outside the scope of the present invention were used; Comparative Examples 26 and 21 are cases where the flake graphites falling outside the scope of the present invention were used; Comparative Example 28 is a case where the pencil lead was produced without adhering nanoparticles A in blending the materials in Example 1 described above; and it has been found that the targeted pencil leads of the present invention are not obtained from the above pencil leads. Further, Comparative Example 29 provides the wood case pencil lead based on Example 11 of Japanese Patent Application Laid-Open No. 138031/2007; Comparative Example 30 provides the wood case pencil lead in which the nanoparticles were not used; and it has been found that the targeted pencil leads are not obtained from the above wood case pencil leads.

Examples 25 to 31 and Comparative Examples 31 to 37

Fifth Embodiment

Example 25

| | |
|---|---|
| Flake natural graphite A (ab face having a flatness of 0.2 µm, mv value: 8 µm, thickness of a c axis: 1 µm, aspect ratio: 8) | 40 parts by mass |
| Nanoparticles K: diamond nanoparticles (sphericity: 10 nm, mv value: 50 nm, manufactured by Sumiseki Materials Co., Ltd.) | 0.4 part by mass |
| Polyvinyl chloride | 40 parts by mass |
| Sodium stearate | 1 part by mass |
| Dioctyl phthalate | 19 parts by mass |

First, the nanoparticles and dioctyl phthalate were dispersed for 180 minutes by means of a bead mill, and the other materials described above were mixed and dispersed (mixing and dispersing time: 20 minutes, hereinafter the same shall apply) by means of a Henschel mixer. The mixture was kneaded by means of a pressure kneader and a roll mill, and after molded, the molded matter was dried to remove dioctyl phthalate and subjected to burning treatment at 1000° C. for 10 hours in nitrogen gas atmosphere, whereby a burned pencil lead body having a diameter of 0.565 mm and a length of 60 mm was produced.

Next, the burned pencil lead body described above was impregnated (impregnation time: 180 minutes, hereinafter the same shall apply) at a pressure of 1 MPa with liquid A (liquid temperature: 100° C., hereinafter the same shall apply) described below, and a nanodiamond-containing burned pencil lead was obtained. Liquid A: dimethyl silicone oil KF 96-30CS (dynamic viscosity: 30 mm$^2$/s, refractive index: 1.401, manufactured by Shin-Etsu Chemical Co., Ltd.)

Nanoparticles K described above had a mv value of 0.125 based on 100 of a volume average diameter (mv value) of flake natural graphite A.

Example 26

Liquid B: CMC-Na 1 wt % in distilled water (dynamic viscosity: 7 mm$^2$/s, refractive index: 1.345)
The burned pencil lead body obtained in Example 25 was impregnated at a pressure of 1 MPa with liquid B described above to obtain a nanodiamond-containing burned pencil lead.

Example 27

Liquid C: trimethylpentaphenyltrisiloxane (dynamic viscosity: 175 mm$^2$/s, refractive index: 1.580, manufactured by Toray Industries, Inc.)

The burned pencil lead body obtained in Example 25 was impregnated at a pressure of 1 MPa with liquid C described above to obtain a nanodiamond-containing burned pencil lead.

Example 28

Liquid D: dimethyl silicone KF 96L-5cs (dynamic viscosity: 5 mm$^2$/s, refractive index: 1.396, manufactured by Shin-Etsu Chemical Co., Ltd.)
The burned pencil lead body obtained in Example 25 was impregnated at a pressure of 1 MPa with liquid D described above to obtain a nanodiamond-containing burned pencil lead.

Example 29

Liquid E: dimethyl silicone KF 96-500cs (dynamic viscosity: 500 mm$^2$/s, refractive index: 1.403, manufactured by Shin-Etsu Chemical Co., Ltd.)
The burned pencil lead body obtained in Example 25 was impregnated at a pressure of 1 MPa with liquid E described above to obtain a nanodiamond-containing burned pencil lead.

Example 30

The burned pencil lead body obtained in Example 25 described above was impregnated at a pressure of 1 MPa with liquid F described below to obtain a nanodiamond-containing burned pencil lead.
Liquid F: obtained by dispersing 0.1 part by mass of nanoparticles L (sphericity: 1 nm, mv value: 5 nm, manufactured by Sumiseki Materials Co., Ltd.) in liquid A.

Example 31

| | |
|---|---|
| Flake natural graphite A (ab face having a flatness of 0.2 µm, mv value: 8 µm, thickness of a c axis: 1 µm, aspect ratio: 8) | 70 parts by mass |
| Nanoparticles K: diamond nanoparticles (sphericity: 10 nm, mv value: 50 nm, manufactured by Sumiseki Materials Co., Ltd.) | 0.4 part by mass |
| Kaolinite clay | 15 parts by mass |
| Halloysite clay | 15 parts by mass |
| Water | 30 parts by mass |

First, the nanoparticles and water were dispersed for 180 minutes by means of a bead mill, and the other materials described above were mixed and dispersed by means of a Henschel mixer. The mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with liquid G described below to obtain a wood case pencil lead having a diameter of 2.05 mm.

Liquid G: Miyoshi Controlled Lard (manufactured by Miyoshi Oil & Fat Co., Ltd.)

Nanoparticles K described above had a mv value of 0.125 based on 100 of a volume average diameter (mv value) of flake natural graphite A.

Comparative Example 31

Based on Example 11 of Japanese Patent Application Laid-Open No. 138031/2007

| | |
|---|---|
| Flake natural graphite (flatness of 3 μm, mv value: 10 μm, thickness of a c axis: 1 μm, an aspect ratio: 10) | 49 parts by mass |
| Diamond nanoparticles (single crystal diamond, sphericity: 1.5 nm, mv value: 5 nm) | 1 part by mass |
| Polyvinyl chloride | 50 parts by mass |
| Sodium stearate | 1 part by mass |
| Dioctyl phthalate | 20 parts by mass |

The materials described above were mixed and dispersed by means of a Henschel mixer and kneaded by means of a pressure kneader and a double roll mill, and the kneaded matter was extrusion-molded in the form of a linear body. Then, the molded matter was subjected to heat treatment in the air in order to remove the residual plasticizer and solidified (dried), and it was then burned at 1000° C. in nitrogen gas atmosphere. Finally, the burned pencil lead was dipped in an α-olefin oligomer (Lipolupe 20, manufactured by Lion Corporation) to obtain a lead HB for a mechanical pencil having a diameter of 0.570 mm.

Comparative Example 32

A nanodiamond-containing burned pencil lead was obtained in the same manner as in Example 25, except that nanoparticles K: diamond nanoparticles (sphericity: 10 nm, mv value: 50 nm, manufactured by Sumiseki Materials Co., Ltd.) used in Example 25 described above was changed to the same amount of nanoparticles G: diamond nanoparticles (sphericity: 25 nm, mv value: 50 nm, manufactured by Sumiseki Materials Co., Ltd.).

Comparative Example 33

A nanodiamond-containing burned pencil lead was obtained in the same manner as in Example 25, except that flake natural graphite A (ab face having a flatness of 0.2 μm, mv value: 8 μm, thickness of a c axis: 1 μm, aspect ratio: 8) used in Example 25 described above was changed to the same amount of flake natural graphite B (ab face having a flatness of 3 μm, mv value: 10 μm, thickness of a c axis: 1 μm, aspect ratio: 10).

Comparative Example 34

A nanodiamond-containing burned pencil lead was obtained in the same manner as in Example 25, except that flake natural graphite A (ab face having a flatness of 0.2 μm, mv value: 8 μm, thickness of a c axis: 1 μm, aspect ratio: 8) used in Example 25 described above was changed to the same amount of flake natural graphite C (ab face having a flatness of 0.2 μm, mv value: 3 μm, thickness of a c axis: 1 μm, aspect ratio: 3).

Comparative Example 35

The pencil lead body obtained without dispersing the nanoparticles in Example 25 described above was impregnated under pressure, as was the case with Example 25, with liquid A used in Example 25 containing no nanoparticles K, and a nanodiamond-non-containing burned pencil lead was obtained.

Comparative Example 36

Based on Example 11 of Japanese Patent Application Laid-Open No. 138031/2007

| | |
|---|---|
| Flake natural graphite (ab face having a flatness of 3 μm, mv value: 10 μm, thickness of a c axis: 1 μm, aspect ratio: 10) | 69 parts by mass |
| Diamond nanoparticles (single crystal diamond, sphericity: 1.5 nm, mv value: 5 nm) | 1 part by mass |
| Kaolinite clay | 15 parts by mass |
| Halloysite clay | 15 parts by mass |
| Water | 30 parts by mass |

The materials described above were mixed and dispersed by means of a Henschel mixer, and the mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with liquid G (Miyoshi Controlled Lard) used in Example 7 to obtain a wood case pencil lead having a diameter of 2.05 mm.

Comparative Example 37

A pencil lead body obtained in the same composition as in Example 31 described above except containing no nanoparticles A was impregnated, as was the case with Example 31, with liquid G (Miyoshi Controlled Lard) used in Example 7 to obtain a wood case pencil lead having a diameter of 2.05 mm.

The respective burned pencil leads (pencil leads for a mechanical pencil and wood case pencil leads) obtained in Examples 25 to 31 and Comparative Examples 31 to 37 were used to evaluate bending strength, compression strength (N), an abrasion amount (mm), intensity, an erasing rate (%), a frictional coefficient (static and dynamic), a nanoparticle number, writing feeling by sensory evaluation, difficulty of stain and initial sliding by the respective evaluation methods described above. The results thereof are shown in the following Table 5.

TABLE 5

|  | Lead diameter mm | Breaking load N | Bending strength MPa | Compression strength N | Abrasion mm | Intensity | Erasing rate % | Frictional coefficient Static | Frictional coefficient Dynamic | Nanoparticle number | Sensory evaluation Writing feeling | Sensory evaluation Difficulty of stain | Sensory evaluation Initial sliding |
|---|---|---|---|---|---|---|---|---|---|---|---|---|---|
| Example 25 | 0.565 | 0.755 | 426.4 | 26.15 | 2.495 | 0.465 | 98.12 | 0.510 | 0.179 | 17 | ⊚ | ⊚ | ⊚ |
| Example 26 | 0.565 | 0.755 | 426.4 | 26.15 | 1.925 | 0.358 | 95.20 | 0.618 | 0.199 | 17 | ⊚ | ⊚ | ○ |
| Example 27 | 0.565 | 0.755 | 426.4 | 26.15 | 2.412 | 0.401 | 98.01 | 0.554 | 0.188 | 17 | ⊚ | ○ | ⊚ |
| Example 28 | 0.565 | 0.755 | 426.4 | 26.15 | 2.591 | 0.401 | 97.08 | 0.605 | 0.181 | 17 | ⊚ | ⊚ | ○ |
| Example 29 | 0.565 | 0.755 | 426.4 | 26.15 | 2.015 | 0.445 | 94.55 | 0.515 | 0.198 | 17 | ○ | ○ | ⊚ |
| Example 30 | 0.565 | 0.735 | 415.1 | 25.12 | 2.011 | 0.448 | 95.68 | 0.681 | 0.191 | 58 | ⊚ | ⊚ | ○ |
| Example 31 | 2.050 | 6.620 | 117.4 | — | 1.558 | 0.423 | 98.37 | 0.666 | 0.189 | 10 | ⊚ | ⊚ | ⊚ |
| Comparative Example 31 | 0.570 | 0.751 | 413.1 | 26.01 | 1.782 | 0.432 | 95.51 | 0.750 | 0.200 | 1000 or more | ⊚ | ⊚ | Δ |
| Comparative Example 32 | 0.570 | 0.755 | 415.3 | 26.01 | 1.782 | 0.432 | 95.51 | 0.781 | 0.202 | 18 | ○ | ⊚ | X |
| Comparative Example 33 | 0.570 | 0.745 | 409.8 | 25.85 | 2.515 | 0.448 | 92.23 | 0.748 | 0.225 | 17 | ○ | Δ | Δ |
| Comparative Example 34 | 0.570 | 0.725 | 398.8 | 26.23 | 3.381 | 0.452 | 89.20 | 0.812 | 0.211 | 17 | ○ | X | X |
| Comparative Example 35 | 0.570 | 0.755 | 415.3 | 26.15 | 2.215 | 0.445 | 97.15 | 0.768 | 0.221 | 0 | Δ | Δ | Δ |
| Comparative Example 36 | 2.050 | 6.350 | 112.6 | — | 1.604 | 0.419 | 95.92 | 0.754 | 0.217 | 1000 or more | ○ | ○ | ⊚ |
| Comparative Example 37 | 2.050 | 6.630 | 117.6 | — | 1.508 | 0.399 | 96.85 | 0.770 | 0.229 | 0 | Δ | Δ | Δ |

Comments on Examples and Comparative Examples in the Fifth Embodiment

As apparent from the results shown in Table 5, it has been found that the respective pencil leads for a mechanical pencil obtained in Examples 25 to 30 and the wood case pencil lead obtained in Example 31 each falling in the scope of the present invention are excellent in bending strength and compression strength and have a satisfactory color forming property and satisfactory drawn line intensity and that they have less abrasion, a good erasing property, good initial sliding and good writing feeling (pen touch) and result in being difficult of stain as compared with the respective pencil leads for a mechanical pencil obtained in Comparative Examples 31 to 35 and the wood case pencil leads obtained in Comparative Examples 36 and 37 each falling outside the scope of the present invention.

In contrast with this, to observe individually the comparative examples, Comparative Example 31 is based on Example 11 of Japanese Patent Application Laid-Open No. 138031/2007; Comparative Example 32 is a case where the nanoparticles falling outside the scope of the present invention were used; Comparative Examples 33 and 34 are cases where the flake graphites falling outside the scope of the present invention were used; Comparative Example 35 is a case where the pencil lead obtained without dispersing the nanoparticles in blending the materials in Example 25 described above was produced; and it has been found that the targeted pencil leads of the present invention which exert strongly lubrication action are not obtained from the above pencil leads. Further, Comparative Example 36 provides the wood case pencil lead based on Example 11 of Japanese Patent Application Laid-Open No. 138031/2007; Comparative Example 37 provides the wood case pencil lead in which the nanoparticles were not used; and it has been found that the targeted pencil leads are not obtained from the above wood case pencil leads.

Examples 32 to 38 and Comparative Examples 38 to 45

Sixth Embodiment

Example 32

| | |
|---|---|
| Flake natural graphite A (ab face having a flatness of 0.2 μm, mv value: 8 μm, thickness of a c axis: 1 μm, aspect ratio: 8) | 40 parts by mass |
| Nanoparticles M: diamond nanoparticles (specific surface area: 208 m$^2$/g, mv value: 50 nm, manufactured by Sumiseki Materials Co., Ltd.) | 0.4 part by mass |
| Polyvinyl chloride | 40 parts by mass |
| Sodium stearate | 1 part by mass |
| Dioctyl phthalate | 19 parts by mass |

First, the nanoparticles and dioctyl phthalate were dispersed for 180 minutes by means of a bead mill, and the other materials described above were mixed and dispersed (mixing and dispersing time: 20 minutes, hereinafter the same shall apply) by means of a Henschel mixer. The mixture was kneaded by means of a pressure kneader and a roll mill, and after molded, the molded matter was dried to remove dioctyl phthalate and then subjected to burning treatment at 1000° C. for 10 hours in nitrogen gas atmosphere, whereby a burned pencil lead body having a diameter of 0.565 mm and a length of 60 mm was produced.

Next, the burned pencil lead body described above was impregnated (impregnation time: 180 minutes, hereinafter the same shall apply) at a pressure of 1 MPa with liquid A (liquid temperature: 100° C., hereinafter the same shall apply) described below, and a nanodiamond-containing burned pencil lead was obtained.
Liquid A: dimethyl silicone oil KF 96-30CS (dynamic viscosity: 30 mm$^2$/s, refractive index: 1.401, manufactured by Shin-Etsu Chemical Co., Ltd.)

Nanoparticles M described above had a mv value of 0.125 based on 100 of a volume average diameter (mv value) of flake natural graphite A.

Example 33

Liquid B: CMC-Na 1 wt % in distilled water (dynamic viscosity: 7 mm$^2$/s, refractive index: 1.345)

The burned pencil lead body obtained in Example 32 was impregnated at a pressure of 1 MPa with liquid B described above to obtain a nanodiamond-containing burned pencil lead.

Example 34

Liquid C: trimethylpentaphenyltrisiloxane (dynamic viscosity: 175 mm$^2$/s, refractive index: 1.580, manufactured by Toray Industries, Inc.)

The burned pencil lead body obtained in Example 32 was impregnated at a pressure of 1 MPa with liquid C described above to obtain a nanodiamond-containing burned pencil lead.

Example 35

Liquid D: dimethyl silicone KF 96L-5cs (dynamic viscosity: 5 mm$^2$/s, refractive index: 1.396, manufactured by Shin-Etsu Chemical Co., Ltd.)

The burned pencil lead body obtained in Example 32 was impregnated at a pressure of 1 MPa with liquid D described above to obtain a nanodiamond-containing burned pencil lead.

Example 36

Liquid E: dimethyl silicone KF 96-500cs (dynamic viscosity: 500 mm$^2$/s, refractive index: 1.403, manufactured by Shin-Etsu Chemical Co., Ltd.)

The burned pencil lead body obtained in Example 32 was impregnated at a pressure of 1 MPa with liquid E described above to obtain a nanodiamond-containing burned pencil lead.

Example 37

The burned pencil lead body obtained in Example 32 was impregnated at a pressure of 1 MPa with liquid F described below to obtain a nanodiamond-containing burned pencil lead.

Liquid F: obtained by dispersing 0.1 part by mass of the nanoparticles L (sphericity: 1 nm, mv value: 5 nm, manufactured by Sumiseki Materials Co., Ltd.) in liquid A.

Example 38

| | |
|---|---|
| Flake natural graphite A (ab face having a flatness of 0.2 μm, mv value: 8 μm, thickness of a c axis: 1 μm, aspect ratio: 8) | 70 parts by mass |
| Nanoparticles M: diamond nanoparticles (specific surface area: 208 m$^2$/g, mv value: 50 nm, manufactured by Sumiseki Materials Co., Ltd.) | 0.4 part by mass |
| Kaolinite clay | 15 parts by mass |
| Halloysite clay | 15 parts by mass |
| Water | 30 parts by mass |

First, the nanoparticles and water were dispersed for 180 minutes by means of a bead mill, and the other materials described above were mixed and dispersed by means of a Henschel mixer. The mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with liquid G described below to obtain a wood case pencil lead having a diameter of 2.05 mm.

Liquid G: Miyoshi Controlled Lard (manufactured by Miyoshi Oil & Fat Co., Ltd.)

The nanoparticles described above had a mv value of 0.125 based on 100 of a volume average diameter (mv value) of flake natural graphite A.

Comparative Example 38

Based on Example 11 of Japanese Patent Application Laid-Open No. 138031/2007

| | |
|---|---|
| Flake natural graphite having a flatness of 3 μm, mv value: 10 μm, thickness of a c axis: 1 μm, aspect ratio of 10) | 49 parts by mass |
| Diamond nanoparticles (cluster diamond, specific surface area: 820 m$^2$/g, mv value: 5 nm) | 1 part by mass |
| Polyvinyl chloride | 50 parts by mass |
| Sodium stearate | 1 part by mass |
| Dioctyl phthalate | 20 parts by mass |

The materials described above were mixed and dispersed by means of a Henschel mixer and kneaded by means of a pressure kneader and a double roll mill, and the kneaded matter was extrusion-molded in the form of a linear body. Then, the molded matter was subjected to heat treatment in the air in order to remove the residual plasticizer and solidified (dried), and it was then burned at 1000° C. in nitrogen gas atmosphere. Finally, the burned pencil lead was dipped in an α-olefin oligomer (Lipolupe 20, manufactured by Lion Corporation) to obtain a lead HB for a mechanical pencil having a diameter of 0.570 mm.

Comparative Example 39

A nanodiamond-containing burned pencil lead was obtained in the same manner as in Example 32, except that the nanoparticles M: diamond nanoparticles (specific surface area: 208 m$^2$/g, mv value: 50 nm, manufactured by Sumiseki Materials Co., Ltd.) used in Example 32 described above was changed to the same amount of nanoparticlesn N: diamond nanoparticles (specific surface area: 18.54 m$^2$/g, mv value: 100 nm, manufactured by Sumiseki Materials Co., Ltd.).

Comparative Example 40

A nanodiamond-containing burned pencil lead was obtained in the same manner as in Example 32, except that the nanoparticles M: diamond nanoparticles (specific surface area: 208 m$^2$/g, mv value: 50 nm, manufactured by Sumiseki Materials Co., Ltd.) used in Example 32 described above was changed to the same amount of the nanoparticles E: cluster diamond nanoparticles (specific surface area: 848 m$^2$/g, mv value: 20 nm, manufactured by Sumiseki Materials Co., Ltd.).

Comparative Example 41

A nanodiamond-containing burned pencil lead was obtained in the same manner as in Example 32, except that flake natural graphite A (ab face having a flatness of 0.2 μm, mv value: 8 μm, thickness of a c axis: 1 μm, aspect ratio: 8) used in Example 32 described above was changed to the same amount of flake natural graphite B (ab face having a flatness of 3 μm, mv value: 10 μm, thickness of a c axis: 1 μm, aspect ratio: 10).

Comparative Example 42

A nanodiamond-containing burned pencil lead was obtained in the same manner as in Example 32, except that flake natural graphite A (ab face having a flatness of 0.2 μm, mv value: 8 μm, thickness of a c axis: 1 μm, aspect ratio: 8) used in Example 32 described above was changed to the same amount of flake natural graphite C (ab face having a flatness of 0.2 μm, mv value: 3 μm, thickness of a c axis: 1 μm, aspect ratio: 3).

Comparative Example 43

The pencil lead body obtained without adding nanoparticles M in blending the materials in Example 32 described above was impregnated under pressure, as was the case with Example 1, with liquid A used in Example 32 containing no nanoparticles M, and a nanodiamond-non-containing burned pencil lead was obtained.

Comparative Example 44

Based on Example 11 of Japanese Patent Application Laid-Open No. 138031/2007

| | |
|---|---|
| Flake natural graphite (ab face having a flatness: 3 μm, mv value: 10 μm, thickness of a c axis: 1 μm, aspect ratio: 10) | 69 parts by mass |
| Diamond nanoparticles (cluster diamond, specific surface area: 820 m$^2$/g, mv value: 5 nm) | 1 part by mass |
| Kaolinite clay | 15 parts by mass |
| Halloysite clay | 15 parts by mass |
| Water | 30 parts by mass |

The materials described above were mixed and dispersed by means of a Henschel mixer, and the mixture was sufficiently kneaded with heating by means of a double roll mill until a moisture there was reduced to about 18 parts by mass. The kneaded matter obtained was extrusion-molded in the form of a linear body by means of a dice for extrusion, and then the molded matter was subjected to heat treatment at 120° C. for 20 hours in the air to remove residual moisture and burned up to 1200° C. in 10 hours and at 1200° C. for 1 hour in nitrogen gas atmosphere.

Next, the burned pencil lead body was impregnated with liquid G (Miyoshi Controlled Lard) used in Example 38 to obtain a wood case pencil lead having a diameter of 2.05 mm.

Comparative Example 45

A pencil lead body obtained in the same composition as in Example 38 described above except containing no nanoparticles A was impregnated, as was the case with Example 7, with liquid G (Miyoshi Controlled Lard) used in Example 7 to obtain a wood case pencil lead having a diameter of 2.05 mm.

The respective burned pencil leads (pencil leads for a mechanical pencil and wood case pencil leads) obtained in Examples 32 to 38 and Comparative Examples 38 to 45 were used to evaluate bending strength, compression strength (N), an abrasion amount (mm), intensity, an erasing rate (%), a frictional coefficient (static and dynamic), a nanoparticle number, writing feeling by sensory evaluation, difficulty of stain and initial sliding by the respective evaluation methods described above. The results thereof are shown in the following Table 6.

TABLE 6

| | Lead diameter mm | Breaking load N | Bending strength MPa | Compression strength N | Abrasion mm | Intensity | Erasing rate % | Frictional coefficient Static | Frictional coefficient Dynamic | Nano-particle number | Sensory evaluation Writing feeling | Sensory evaluation Difficulty of stain | Sensory evaluation Initial sliding |
|---|---|---|---|---|---|---|---|---|---|---|---|---|---|
| Example 32 | 0.565 | 0.755 | 426.4 | 26.15 | 2.495 | 0.465 | 98.12 | 0.510 | 0.179 | 17 | ◎ | ◎ | ◎ |
| Example 33 | 0.565 | 0.755 | 426.4 | 26.15 | 1.925 | 0.358 | 95.20 | 0.618 | 0.199 | 17 | ◎ | ◎ | ○ |
| Example 34 | 0.565 | 0.755 | 426.4 | 26.15 | 2.412 | 0.401 | 98.01 | 0.554 | 0.188 | 17 | ◎ | ○ | ◎ |
| Example 35 | 0.565 | 0.755 | 426.4 | 26.15 | 2.591 | 0.401 | 97.08 | 0.605 | 0.181 | 17 | ◎ | ◎ | ○ |
| Example 36 | 0.565 | 0.755 | 426.4 | 26.15 | 2.015 | 0.445 | 94.55 | 0.515 | 0.198 | 17 | ○ | ○ | ◎ |
| Example 37 | 0.565 | 0.735 | 415.1 | 25.12 | 2.011 | 0.448 | 95.68 | 0.681 | 0.191 | 58 | ◎ | ◎ | ○ |
| Example 38 | 2.050 | 6.580 | 116.7 | — | 1.562 | 0.425 | 98.74 | 0.617 | 0.188 | 11 | ◎ | ◎ | ◎ |
| Comparative Example 38 | 0.570 | 0.751 | 413.1 | 26.01 | 1.782 | 0.432 | 95.51 | 0.750 | 0.200 | 1000 or more | ◎ | ◎ | Δ |
| Comparative Example 39 | 0.570 | 0.691 | 380.1 | 26.51 | 2.815 | 0.439 | 94.15 | 0.761 | 0.223 | 2 | ○ | ◎ | Δ |
| Comparative Example 40 | 0.570 | 0.653 | 359.2 | 22.15 | 1.512 | 0.331 | 88.75 | 0.784 | 0.231 | 52 | Δ | Δ | Δ |
| Comparative Example 41 | 0.570 | 0.745 | 409.8 | 25.85 | 2.515 | 0.448 | 92.23 | 0.784 | 0.225 | 17 | ○ | Δ | Δ |
| Comparative Example 42 | 0.570 | 0.725 | 398.8 | 26.23 | 3.381 | 0.452 | 89.20 | 0.812 | 0.211 | 17 | ○ | X | X |
| Comparative Example 43 | 0.570 | 0.755 | 415.3 | 26.15 | 2.215 | 0.445 | 97.15 | 0.768 | 0.221 | 0 | Δ | Δ | Δ |

TABLE 6-continued

| | Lead diameter mm | Breaking load N | Bending strength MPa | Compression strength N | Abrasion mm | Intensity | Erasing rate % | Frictional coefficient Static | Frictional coefficient Dynamic | Nano-particle number | Sensory evaluation Writing feeling | Sensory evaluation Difficulty of stain | Sensory evaluation Initial sliding |
|---|---|---|---|---|---|---|---|---|---|---|---|---|---|
| Comparative Example 44 | 2.050 | 5.990 | 106.2 | — | 1.600 | 0.411 | 94.69 | 0.706 | 0.219 | 1000 or more | ○ | ○ | ◎ |
| Comparative Example 45 | 2.050 | 6.630 | 117.6 | — | 1.508 | 0.399 | 96.85 | 0.770 | 0.229 | 0 | Δ | Δ | Δ |

Comments on Examples and Comparative Examples in the Sixth Embodiment

As apparent from the results shown in Table 6, it has been found that the respective pencil leads for a mechanical pencil obtained in Examples 32 to 37 and the wood case pencil lead obtained in Example 38 each falling in the scope of the present invention are excellent in bending strength and compression strength and have a satisfactory color forming property and satisfactory drawn line intensity and that they have less abrasion, a good erasing property, good initial sliding and good writing feeling (pen touch) and result in being difficult of stain as compared with the respective pencil leads for a mechanical pencil obtained in Comparative Examples 38 to 43 and the wood case pencil leads obtained in Comparative Examples 44 and 45 each falling outside the scope of the present invention.

In contrast with this, to observe individually the comparative examples, Comparative Example 38 is based on Example 11 of Japanese Patent Application Laid-Open No. 138031/2007; Comparative Examples 39 and 40 are cases where the nanoparticles falling outside the scope of the present invention were used; Comparative Examples 41 and 42 are cases where flake graphites falling outside the scope of the present invention were used; Comparative Example 43 is a case where the pencil lead obtained without dispersing the nanoparticles in blending the materials in Example 32 described above was produced; and it has been found that the targeted pencil leads of the present invention which exert strongly lubrication action are not obtained from the above pencil leads. Further, Comparative Example 44 provides the wood case pencil lead based on Example 11 of Japanese Patent Application Laid-Open No. 138031/2007; Comparative Example 45 provides the wood case pencil lead in which the nanoparticles were not used; and it has been found that the targeted pencil leads are not obtained from the above wood case pencil leads.

INDUSTRIAL APPLICABILITY

Obtained is a production process for a pencil lead which has better and smoother writing feeling and which provides drawn lines with high intensity and a brilliant black color, wherein it is a pencil lead used for a mechanical pencil of a type in which a lead is rotated whenever written to always carry out writing by a fresh part in addition to pencil leads used for mechanical pencils, wood case holder pencils and the like.

What is claimed is:
1. A pencil lead containing flake graphite which has an ab face having a flatness of at least 2 μm or less and in which an aspect ratio of an a axis or a b axis in the ab face to a c axis is 5 or more, wherein nanoparticles having a mv value of 0.05 to 2 based on 100 of a volume average diameter (mv value) of the graphite and having a sphericity of 0.1 to 20 nm are in contact with the ab face of the graphite.

2. The pencil lead as claimed in claim 1, wherein the nanoparticles used for the pencil lead are carbon nanoparticles.

3. The pencil lead as claimed in claim 2, wherein the carbon nanoparticles are diamond.

4. The pencil lead as claimed in claim 1, wherein the nanoparticles have a volume average diameter (mv value) of 4 to 100 nm.

5. The pencil lead as claimed in claim 1, wherein a total frictional coefficient obtained by dividing an average value (n=10) of total frictional forces in lines drawn by a drawing method using a drawing apparatus prescribed in JIS S 6005: 2007 by a writing load is 0.191 to 0.218.

6. The pencil lead as claimed in claim 1, wherein when a polished cross section of the pencil lead is observed in an area of 5 μm×5 μm by means of FE-SEM (accelerating voltage: 5 kV), 1 to 300 particles of the nanoparticles are observed.

7. A production process for the pencil lead as claimed in claim 1, wherein a lead body of a pencil lead containing flake graphite which has an ab face having a flatness of at least 2 μm or less and in which an aspect ratio of an a axis or a b axis in the ab face to a c axis is 5 or more is formed; then nanoparticles are dispersed in a liquid having a refractive index of 1.3 to 1.5 and a viscosity of 7 to 200 mm$^2$/s at 25° C., and the lead body is then impregnated with the liquid.

8. A pencil lead containing flake graphite which has an ab face having a flatness of at least 2 μm or less and in which an aspect ratio of an a axis or a b axis in the ab face to a c axis is 5 or more, wherein nanoparticles having a mv value of 0.05 to 2 based on 100 of a volume average diameter (mv value) of the graphite and having a specific surface area of 50 to 800 m$^2$/g are in contact with the ab face of the graphite.

9. The pencil lead as claimed in claim 8, wherein the nanoparticles used for the pencil lead are carbon nanoparticles.

10. The pencil lead as claimed in claim 9, wherein the carbon nanoparticles are diamond.

11. The pencil lead as claimed in claim 8, wherein the nanoparticles have a volume average diameter (mv value) of 4 to 100 nm.

12. The pencil lead as claimed in claim 8, wherein a total frictional coefficient obtained by dividing an average value (n=10) of total frictional forces in lines drawn by a drawing method using a drawing apparatus prescribed in JIS S 6005: 2007 by a writing load is 0.191 to 0.218.

13. The pencil lead as claimed in claim 8, wherein when a polished cross section of the pencil lead is observed in an area of 5 μm×5 μm by means of FE-SEM (accelerating voltage: 5 kV), 1 to 300 particles of the nanoparticles are observed.

14. A production process for the pencil lead as claimed in claim 8, wherein a lead body of a pencil lead containing flake graphite which has an ab face having a flatness of at least 2 μm or less and in which an aspect ratio of an a axis or a b axis in the ab face to a c axis is 5 or more is formed; then nanoparticles are dispersed in a liquid having a refractive index of 1.3 to 1.5 and a viscosity of 7 to 200 mm$^2$/s at 25° C., and the lead body is then impregnated with the liquid.

15. A pencil lead containing flake graphite which has an ab face having a flatness of at least 2 μm or less and in which an aspect ratio of an a axis or a b axis in the ab face to a c axis is 5 or more, wherein nanoparticles having a mv value of 0.05 to 2 based on 100 of a volume average diameter (mv value) of the graphite and having a sphericity of 0.1 to 20 nm are adhered to the ab face of the graphite.

16. The pencil lead as claimed in claim 15, wherein the nanoparticles used for the pencil lead are carbon nanoparticles.

17. The pencil lead as claimed in claim 16, wherein the carbon nanoparticles are diamond.

18. The pencil lead as claimed in claim 15, wherein the nanoparticles have a volume average diameter (mv value) of 4 to 100 nm.

19. The pencil lead as claimed in claim 15, wherein a clearance formed between the flake graphites by the nanoparticles is impregnated with a liquid having a refractive index of 1.3 to 1.5 and a viscosity of 7 to 200 mm$^2$/s at 25° C.

20. The pencil lead as claimed in claim 15, wherein a total frictional coefficient obtained by dividing an average value (n=10) of total frictional forces in lines drawn by a drawing method using a drawing apparatus prescribed in JIS S 6005: 2007 by a writing load is 0.191 to 0.218.

21. The pencil lead as claimed in claim 15, wherein when a polished cross section of the pencil lead is observed in an area of 5 μm×5 μm by means of FE-SEM (accelerating voltage: 5 kV), 1 to 300 particles of the nanoparticles are observed.

22. A production process for the pencil lead as claimed in claim 15, wherein flake graphite which has an ab face having a flatness of at least 2 μm or less and in which an aspect ratio of an a axis or a b axis in the ab face to a c axis is 5 or more is brought into contact with nanoparticles having a mv value of 0.05 to 2 based on 100 of a volume average diameter (mv value) of the graphite and having a sphericity of 0.1 to 20 nm; then the nanoparticles are fixed thereon to prepare a composite; a lead body is formed by using the composite graphite and impregnated with a liquid having a refractive index of 1.3 to 1.5 and a viscosity of 7 to 200 mm$^2$/s at 25° C.

23. The production process for the pencil lead as claimed in claim 22, wherein the graphite is brought into contact with the nanoparticles by electrostatic force.

24. A pencil lead containing flake graphite which has an ab face having a flatness of at least 2 μm or less and in which an aspect ratio of an a axis or a b axis in the ab face to a c axis is 5 or more, wherein nanoparticles having a mv value of 0.05 to 2 based on 100 of a volume average diameter (mv value) of the graphite and having a specific surface area of 50 to 800 m$^2$/g are adhered to the ab face of the graphite.

25. The pencil lead as claimed in claim 24, wherein the nanoparticles used for the pencil lead are carbon nanoparticles.

26. The pencil lead as claimed in claim 25, wherein the carbon nanoparticles are diamond.

27. The pencil lead as claimed in claim 24, wherein the nanoparticles have a volume average diameter (mv value) of 4 to 100 nm.

28. The pencil lead as claimed in claim 24, wherein a clearance formed between the flake graphites by the nanoparticles is impregnated with a liquid having a refractive index of 1.3 to 1.5 and a viscosity of 7 to 200 mm$^2$/s at 25° C.

29. The pencil lead as claimed in claim 24, wherein a total frictional coefficient obtained by dividing an average value (n=10) of total frictional forces in lines drawn by a drawing method using a drawing apparatus prescribed in JIS S 6005: 2007 by a writing load is 0.191 to 0.218.

30. The pencil lead as claimed in claim 24, wherein when a polished cross section of the pencil lead is observed in an area of 5 μm×5 μm by means of FE-SEM (accelerating voltage: 5 kV), 1 to 300 particles of the nanoparticles are observed.

31. A production process for the pencil lead as claimed in claim 24, wherein flake graphite which has an ab face having a flatness of at least 2 μm or less and in which an aspect ratio of an a axis or a b axis in the ab face to a c axis is 5 or more is brought into contact with nanoparticles having a mv value of 0.05 to 2 based on 100 of a volume average diameter (mv value) of the graphite and having a specific surface area of 50 to 800 m$^2$/g; then the nanoparticles are fixed thereon to prepare a composite; a lead body is formed by using the composite graphite and impregnated with a liquid having a refractive index of 1.3 to 1.5 and a viscosity of 7 to 200 mm$^2$/s at 25° C.

32. The production process for the pencil lead as claimed in claim 31, wherein the graphite is brought into contact with the nanoparticles by electrostatic force.

33. A production process for a pencil lead, wherein flake graphite which has an ab face having a flatness of at least 2 μm or less and in which an aspect ratio of an a axis or a b axis in the ab face to a c axis is 5 or more and nanoparticles having a mv value of 0.05 to 2 based on 100 of a volume average diameter (my value) of the graphite and having a sphericity of 0.1 to 20 nm are dispersed in a plasticizer or a solvent and kneaded, and then a lead body is formed from the kneaded matter.

34. The production process for a pencil lead as claimed in claim 33, wherein the nanoparticles are carbon nanoparticles.

35. The production process for a pencil lead as claimed in claim 34, wherein the nanoparticles are diamond.

36. The production process for a pencil lead as claimed in claim 33, wherein the nanoparticles have a volume average diameter (mv value) of 4 to 100 nm.

37. The production process for a pencil lead as claimed in claim 33, wherein a total frictional coefficient obtained by dividing an average value (n=10) of total frictional forces in lines drawn by a drawing method using a drawing apparatus prescribed in JIS S 6005:2007 by a writing load is 0.191 to 0.218.

38. The production process for a pencil lead as claimed in claim 33, wherein a clearance formed between the flake graphites by the nanoparticles is impregnated with a liquid having a refractive index of 1.3 to 1.5 and a viscosity of 7 to 200 mm$^2$/s at 25° C. after forming the lead body.

39. The production process for a pencil lead as claimed in claim 33, wherein when a polished cross section of the pencil lead is observed in an area of 5 μm×5 μm by means of FE-SEM (accelerating voltage: 5 kV), 1 to 300 nanoparticles are observed.

40. A production process for a pencil lead, wherein flake graphite which has an ab face having a flatness of at least 2 μm or less and in which an aspect ratio of an a axis or a b axis in the ab face to a c axis is 5 or more and nanoparticles having a mv value of 0.05 to 2 based on 100 of a volume average diameter (my value) of the graphite and having specific surface area of 50 to 800 m$^2$/g are dispersed in a plasticizer or a solvent and kneaded, and then a lead body is formed from the kneaded matter.

41. The production process for a pencil lead as claimed in claim 40, wherein the nanoparticles are carbon nanoparticles.

42. The production process for a pencil lead as claimed in claim 41, wherein the nanoparticles are diamond.

43. The production process for a pencil lead as claimed in claim 40, wherein the nanoparticles have a volume average diameter (mv value) of 4 to 100 nm.

44. The production process for a pencil lead as claimed in claim 40, wherein a total frictional coefficient obtained by dividing an average value (n=10) of total frictional forces in lines drawn by a drawing method using a drawing apparatus prescribed in JIS S 6005:2007 by a writing load is 0.191 to 0.218.

45. The production process for a pencil lead as claimed in claim 40, wherein a clearance formed between the flake graphites by the nanoparticles is impregnated with a liquid having a refractive index of 1.3 to 1.5 and a viscosity of 7 to 200 $mm^2$/s at 25° C. after forming the lead body.

46. The production process for a pencil lead as claimed in claim 40, wherein when a polished cross section of the pencil lead is observed in an area of 5 μm×5 μm by means of FE-SEM (accelerating voltage: 5 kV), 1 to 300 nanoparticles are observed.

\* \* \* \* \*